(12) United States Patent
Takeuchi et al.

(10) Patent No.: US 7,751,294 B2
(45) Date of Patent: Jul. 6, 2010

(54) INFORMATION RECORDING METHOD, INFORMATION RECORDING APPARATUS, OPTICAL DISK, PROGRAM AND COMPUTER READABLE RECORDING MEDIUM

(75) Inventors: Kohji Takeuchi, Kanagawa (JP); Kenya Yokoi, Kanagawa (JP); Yukiko Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1013 days.

(21) Appl. No.: 11/403,885

(22) Filed: Apr. 14, 2006

(65) Prior Publication Data

US 2006/0262694 A1 Nov. 23, 2006

Related U.S. Application Data

(63) Continuation of application No. PCT/JP2004/015079, filed on Oct. 13, 2004.

(30) Foreign Application Priority Data

Oct. 17, 2003 (JP) .............................. 2003-357397
Apr. 28, 2004 (JP) .............................. 2004-133222

(51) Int. Cl.
G11B 5/09 (2006.01)

(52) U.S. Cl. .................................................. 369/59.11

(58) Field of Classification Search .............. 369/13.26, 369/47.5, 59.11
See application file for complete search history.

(56) References Cited

U.S. PATENT DOCUMENTS

| 5,481,525 A * | 1/1996 | Saito et al. .................. 369/116 |
| 2002/0021463 A1 | 2/2002 | Turner et al. |
| 2004/0027958 A1* | 2/2004 | Takeuchi et al. ......... 369/53.41 |

FOREIGN PATENT DOCUMENTS

| JP | 10-134353 A | 5/1998 |
| JP | 2002-245626 A | 8/2002 |
| JP | 2002-329315 A | 11/2002 |
| JP | 2003-91822 A | 3/2003 |
| WO | WO 01/13365 A1 | 2/2001 |
| WO | WO 01/73768 A1 | 10/2001 |

\* cited by examiner

*Primary Examiner*—Andrea L Wellington
*Assistant Examiner*—Aneeta Yodichkas
(74) *Attorney, Agent, or Firm*—Dickstein Shapiro LLP

(57) ABSTRACT

An information recording method includes the steps of recording test data with changing a top pulse width Ton and monitoring reflected light intensity; determining an optimum top pulse width from the monitoring result; determining respective optimum off pulse widths according to multilevel data from a monitoring result of the determined optimum top pulse width; recording test data with changing recording power in sequence with the use of the optimum top pulse width and the optimum off pulse width determined, monitoring reflected light intensity, and thus determining optimum recording power.

6 Claims, 17 Drawing Sheets

INFORMATION RECORDING METHOD, INFORMATION RECORDING APPARATUS, OPTICAL DISK, PROGRAM AND COMPUTER READABLE RECORDING MEDIUM

CROSS-REFERENCE TO RELATED APPLICATION

This application is a U.S. continuation application filed under 35 USC 111(a) claiming benefit under 35 USC 120 and 365(c) of PCT application JP2004/015079, filed Oct. 13, 2004, which claims priority to Application Ser. No. 2003-357397 and 2004-133222, filed in Japan on Oct. 17, 2003 and Apr. 28, 2004, respectively. The foregoing applications are hereby incorporated herein by reference.

BACKGROUND OF THE INVENTION

1. Field of the Invention

The present invention relates to an information recording method, an information recording apparatus and an optical disk, for recording record marks corresponding to multilevel data on an optical disk such as a rewriteable phase change type optical disk, a program for causing a computer to execute the information recording method, and a computer readable recording medium recoding the program.

2. Description of the Related Art

Recently, along with progress of digital technology and improvement of data compression technology, an optical disk such as a CD-ROM, or a DVD-ROM having the same diameter but being able to record approximately seven times of data, has become taking attention. An optical disk apparatus reproducing contents from the optical disk has spread with the costs thereof reduced.

The optical disk only for reproduction such as a CD-ROM or a DVD-ROM has, on its recording surface, spiral or concentric pit series produced thereon. Information is recorded with the use of a length of a pit, an interval therebetween and a combination thereof. In this case, information is transformed (binarized) into a combination of two numerals (binary), i.e., 0 and 1, and is written in the optical disk. Such a recording way is called a binary recording method.

An information size of the above-mentioned contents increases year by year, and a further increase in the information size recordable in the optical disk is expected. As a way of increasing the information size recordable to the optical disk, a way of writing in the optical disk in such a manner that the information is transformed into more than the two of numerals. Various types of related arts have been developed eagerly for taking this art into a practical use. Below, for the sake of convenience, to transform information into more than the two numerals is referred to as, to transform into multilevel data. Further, such a way of recording information with multilevel data is referred to as a multilevel recording method.

As to rewriteable optical disk recording, individual difference and/or operation environment of the optical disk and the optical disk apparatus have an influence. Therefore, recording conditions should be optimized for each combination thereof. For example, for a case of a phase change type optical disk, in order to produce desired record marks, a recording laser light emitting time width, recording power and erasure power are controlled.

According to Patent Document 1 for multilevel data recording, in order to positively reproduce multilevel-re-corded data, trial writing is carried out, and test recording is carried out until a desired reproduced signal is obtained. Recording correction (recording condition modification) is carried out by the following process:

(1) Test data is recorded/reproduced;
(2) An ideal waveform and a reproduced signal waveform are compared;
(3) Convergence occurs? If Yes, the process is finished;
(4) If No, the laser emitting condition is corrected; and
(5) The process is returned to (1).

With reference to FIG. 12, a multilevel recording method to which the present invention is applicable is described. Recording is carried out for each recording cell having a fixed length on a recording track, in such a manner that a reproduced signal level changes corresponding to multilevel data. Reproduction of multilevel data is carried out such that the reproduced signal is sampled at a predetermined frequency (for example, at a central position of the recording cell), and the multilevel data is determined from the sampled reflected light intensity. A reproduction light spot diameter is longer than a circumferential direction length of the recording cell, and thus, intersymbol interference occurs. In the prior art, in consideration of the intersymbol inference, the above-mentioned recording correction is carried out. Thereby, the multilevel data can be determined precisely. For 8-level recording, combinations of multilevel data to consider amount to $8^3=512$. Accordingly, a considerable time is required for optimization of the recording conditions.

Japanese Laid-open Patent Application No. 2003-091822 discloses a recording method by which, even with an easy method without carrying out complicated process of Japanese Laid-open Patent Application No. 10-134353, the optimum recording conditions (recording power and recording pulse widths) can be determined. According to Japanese Laid-open Patent Application No. 2003-091822, recording power by which reflected light intensity is saturated is obtained as optimum recording power, while a pulse width by which reflected light intensity is saturated is obtained as an optimum pulse width. Then, based on the optimum pulse width, other multilevel data pulse widths are determined. The pulse width proposed there is defined as a ratio between a total of a top pulse width Ton and an off pulse width Toff, and the cell time width Tc (see FIG. 1).

Patent Document 1: Japanese Laid-open Patent Application No. 10-134353; and

Patent Document 2: Japanese Laid-open Patent Application No. 2003-091822

SUMMARY OF THE INVENTION

However, in the method of Japanese Laid-open Patent Application No. 2003-091822, although the optimum recording power can be determined, the optical pulse width cannot be determined. This point will be described now.

In the above-mentioned proposed example, (top pulse width Ton+off pulse width Toff)/cell time width Tc (referred to as ξ, hereinafter) is determined. However, each pulse width is not prescribed. There are many combinations of the top pulse width Ton and the off pulse width Toff in which the ratio ξ is common. Thus, unique values cannot be determined. These combinations affect the reproduced signal quality, and, unless a proper combination is selected, multilevel data cannot be precisely reproduced.

Specifically, as shown in FIG. 13, when the top pulse width Ton is increased, large heat is applied on the disk surface. Thereby a mark width in a radial direction increases, and cross talk occurs in which a signal from an adjacent record mark is included in a reproduced signal. Further, cross erasure may occur in which a part of a mark recorded in an adjacent track is erased. These may cause a change in the reflected light intensity. Accordingly, in the multilevel recording in which the multilevel data is determined from the reflected light intensity, recorded data may not be reproduced precisely.

In any manner, an optimum combination of the top pulse width and the off pulse width changes due to individual difference between the optical disk and the optical disk apparatus and a change in the operation environment. Accordingly, the optimization is required before user data is recorded.

An object of the present invention is to make it possible to determine the optimum recording power and the optimum recording pulse width (top pulse width and off pulse width) regardless of individual difference between the optical disk and the information recording apparatus or the environmental condition shift.

Another object of the present invention is to make it possible to record recording mark series with the optimum recording widths (top pulse width and off pulse width) from which reproduction can be made with optimum reflected light intensity with an easy configuration without applying an excessive resolution pulse width generating circuit, regardless of individual difference of the optical disk and the information recording apparatus, and the environmental condition shift, in the multilevel recording method.

Another object of the present invention is to make it possible to carry out stable recording without being affected by individual difference of the optical disk and the information recording apparatus, and the environmental condition shift.

Another object of the present invention is to make it possible to carry out stable recording within a short time without being affected by individual difference of the optical disk and the information recording apparatus, and the environmental condition shift.

Another object of the present invention is to provide an optical disk in which initial values for test recording can be set.

The present invention in aspect 1 is an information recording method for recording record marks corresponding to multilevel data on an optical disk with predetermined recording power with the use of recording pulses including a set of a top pulse, an off pulse and an erasure pulse, including: first step of recording first test data with changing the top pulse width Ton and monitoring reflected light intensity corresponding to the first test data; second step of determining an optimum top pulse width Ton from the monitoring result; third step of determining respective optimum off pulse widths Toff corresponding to multilevel data, from a monitoring result of the optimum top pulse width Ton determined in the second step; fourth step of recording second test data with changing recording power in sequence with the use of the optimum top pulse width Ton and the optimum off pulse width Toff determined in the second and third steps, monitoring reflected light intensity corresponding to the second test data, and determining optimum recording power from the monitoring result.

The present invention in aspect 2 is the information recording method of aspect 1, wherein: in the second step, the shortest top pulse width Ton with which the monitored reflected light intensity reaches a saturated value is determined as the optimum top pulse width.

The present invention in aspect 3 is the information recording method of aspect 1, wherein: in the second step, the following relational expression is obtained from the monitoring result, between the off pulse width Toff and the reflected light intensity with respect to the respective top pulse widths Ton:

$$I = a \cdot Toff^3 + b \cdot Toff^2 + c \cdot Toff + d$$

and the top pulse width Ton with which the absolute value of the coefficient c becomes smallest is determined as the optimum top pulse width.

The present invention in aspect 4 is the information recording method of aspect 1, wherein: in the third step, assuming that the off pulse width is Toff(m), reflected light intensity is I(m) and coefficient is α when multilevel data m is test recorded, the optimum off pulse width Toff opt(m) corresponding to the multilevel data m is set with the use of the following relational expression for the reflected light intensity L(m) as a target value of the multilevel data m:

$$Toff\ opt(m) = \alpha \cdot (I(m) - L(m))/(I(m+1) - I(m))/(Toff(m+1) - Toff(m)) + Toff(m).$$

The present invention in aspect 5 is the information recording method of aspect 1, wherein: in the third step, the optimum off pulse width Toff(m) corresponding to the multilevel data m is set with the use of the following relational expression between the off pulse width Toff(m) and the reflected light intensity I(m):

$$I(m) = a \cdot Toff(m)^3 + b \cdot Toff(m)^2 + c \cdot Toff(m) + d.$$

The present invention in aspect 6 is the information recording method of aspect 1, wherein: in the first step, the following expression between the off pulse width Toff and the reflected light intensity I with respect to the respective top pulse widths Ton from the monitoring result:

$$I = a \cdot Toff^3 + b \cdot Toff^2 + c \cdot Toff + d$$

is obtained, the coefficients a, b, c and d are approximated as functions of the top pulse width Ton, a Toff-reflected light intensity curve for the top pulse width Ton is estimated, and the shortest top pulse width Ton with which the reflected light intensity I becomes a saturated value is determined as the optimum top pulse width.

The present invention in aspect 7 is the information recording method of aspect 1, wherein: in the first step, the following expression between the off pulse width Toff and the reflected light intensity I with respect to the respective top pulse widths Ton from the monitoring result:

$$I = a \cdot Toff^3 + b \cdot Toff^2 + c \cdot Toff + d$$

is obtained, the coefficients a, b, c and d are approximated as functions of the top pulse width Ton, a Toff-reflected light intensity curve for the top pulse width Ton is estimated, and the top pulse width Ton with which the off pulse width Toff and the reflected light intensity I become approximately linear is set for each multilevel data.

The present invention in aspect 8 is the information recording method of any one of aspects 1 through 7, wherein: in the fourth step, test recording is carried out for each recording pulse setting, and recording power with which a deviation of the reflected light intensity becomes minimum is determined as the optimum recording power.

The present invention in aspect 9 is an information recording method for recording record marks corresponding to multilevel data on an optical disk with predetermined recording power with the use of recording pulses including a set of a top pulse, an off pulse and an erasure pulse, wherein: setting is made such that both the top pulse width Ton(m) and the off pulse width Toff(m) corresponding to the multilevel data become integral times of a unit time T.

The present invention in aspect 10 is an information recording method for recording record marks corresponding to multilevel data on an optical disk with predetermined recording power with the use of recording pulses including a set of a top pulse, an off pulse and an erasure pulse, wherein: the off pulse width Toff is an integral time of a unit time T, and is increased according to increase in the record marks approximately linearly.

The present invention in aspect 11 is an information recording method for recording record marks corresponding to multilevel data on an optical disk with predetermined recording power with the use of recording pulses including a set of a top pulse, an off pulse and an erasure pulse, wherein: the off pulse width Toff is an integral time of a unit time T, and is increased according to increase in the record marks approximately linearly, and the top pulse width Ton is an integral time of a unit time T, and is changed to a predetermined time according to increase in the record marks corresponding to each multilevel data.

The present invention in aspect 12 is the information recording method in any one of aspects 9 through 11, wherein: recording pulses are set such that, for a record mark of the multilevel data with which the reflected light intensity has approximately a medium level through a maximum level, the top pulse width Ton is increased, and, for a record mark with which the reflected light intensity has approximately the medium level through a minimum level, the top pulse width Ton corresponds to approximately an identical time.

The present invention in aspect 13 is the information recording method in any one of aspects 9 through 12, wherein: assuming that the multilevel data m has an integer value not less than 0 increasing according to increase of the record marks; the top pulse width Ton(m) and the off pulse width Toff(m) are set such that, for a unit time obtained from dividing a cell period which is a period of the record mark by n (n is fixed), the top pulse width Ton(m)=j×Tc/n (j is an integer) is satisfied, and also, the off pulse width Toff(m)=k×Tc/n (k is an integer) is satisfied, and also, setting is made such that the top pulse coefficient j is increased approximately linearly, and the off pulse coefficient k is increased with respect to the record mark of the multilevel data with which the reflected light intensity has approximately a medium level through a maximum level, but is approximately identical value with respect to the record mark with which the reflected light intensity has approximately the medium level through a minimum level.

The present invention in aspect 14 is the information recording method in any one of aspects 9 through 13, wherein: the top pulse coefficient and the off pulse coefficient corresponding to integer times of the period Tc/n are selected so that the reflected light intensity from the optical disk corresponding to the multilevel data m has a predetermined level.

The present invention in aspect 15 is the information recording method in any one of aspects 9 through 14, wherein: assuming that the multilevel data m has an integer not less than 0 increasing along with increase of the record marks, setting is made such that, with respect to a record mark of the multilevel data with which the reflected light intensity has a minimum level, the top pulse coefficient j is increased.

The present invention in aspect 16 is an information recording method for recording record marks corresponding to multilevel data on an optical disk with predetermined recording power with the use of recording pulses including a set of a top pulse, an off pulse and an erasure pulse, wherein: when the top pulse width Ton and the off pulse width Toff corresponding to the multilevel data are set, the top pulse width Ton is increased with respect to a record mark more than a predetermined value, for a case where a record mark length of a spot diameter (relative intensity $1/e^2$) on a recording layer used in recording/reproduction with respect to a cell length for each multilevel data is not more than a predetermined value.

The present invention in aspect 17 is the information recording method in aspect 16, wherein: the record mark length corresponding to the multilevel data at which the top pulse width Ton is increased is not more than approximately ¼ the spot diameter on the recording layer used in recording/reproduction.

The present invention in aspect 18 is the information recording method in any one of aspects 1 through 16, wherein: the optical disk includes a phase change type optical recording medium.

The present invention in aspect 19 is the information recording method in aspect 18, wherein: the recording layer of the phase change type optical recording medium includes Ag—In—Sb—Te.

The present invention in aspect 20 is an information recording apparatus for recording record marks corresponding to multilevel data on an optical disk with predetermined recording power with the use of recording pulses including a set of a top pulse, an off pulse and an erasure pulse, including: first means for recording first test data with changing the top pulse width Ton and monitoring reflected light intensity corresponding to the first test data; second means for determining an optimum top pulse width Ton from the monitoring result; third means for determining respective optimum off pulse widths Toff corresponding to multilevel data, from a monitoring result of the optimum top pulse width Ton determined by the second means; and fourth means for recording second test data with changing recording power in sequence with the use of the optimum top pulse width Ton and the optimum off pulse width Toff determined by the first and second means, monitoring reflected light intensity corresponding to the second test data, and determining optimum recording power from the monitoring result.

The present invention in aspect 21 is an information recording method for recording record marks corresponding to multilevel data on an optical disk with predetermined recording power with the use of recording pulses including a set of a top pulse, an off pulse and an erasure pulse, including: first step of reading recording power Pw and a ratio ϵ between erasure power Pe and recording power Pw, and recording parameters including the top pulse width Ton and the off pulse width Toff corresponding to the multilevel data, previously written in the optical disk; second step of test recording first test data with changing recording power in sequence with the use of the read top pulse width Ton, off pulse width Toff and ratio ϵ between the erasure power Pe and the recording power Pw, and monitoring the reflected light intensity corresponding to the first test data; and third step of determining the optimum recording power Pw from the monitoring result.

The present invention in aspect 22 is the information recording method in aspect 21, wherein: in the third step, a relational expression between the multilevel data m and the reflected light intensity I $$I = a \cdot m^2 + b \cdot m + c$$

is obtained from the monitoring result, and recording power at which the coefficient e becomes minimum is determined as the optimum recording power.

The present invention in aspect 23 is an information recording method for recording record marks corresponding to multilevel data on an optical disk with predetermined recording power with the use of recording pulses including a set of a top pulse, an off pulse and an erasure pulse, including: first step of reading recording power Pw and a ratio ϵ between erasure power Pe and recording power Pw, and recording parameters including the top pulse width Ton and the off pulse width Toff corresponding to the multilevel data, previously written in the optical disk; second step of test recording first test data with changing recording power in sequence with the use of the read top pulse width Ton, off pulse width Toff and ratio ϵ between the erasure power Pe and the recording power Pw, and monitoring the reflected light intensity corresponding to the first test data; third step of determining the optimum recording power from the monitoring result; fourth step of obtaining relational expression I=a·m+b between the multilevel data m and the reflected light intensity I, and calculating $r^2$ which is second power of correlation coefficient r; fifth step of determining linearity between the multilevel data m and the reflected light intensity I with the use of the correlation coefficient $r^2$; sixth step of test recording the first test data with changing the off pulse width Toff, and monitoring the reflected light intensity corresponding to the first test data; and seventh step of determining respective optimum off pulse widths Toff corresponding to the multilevel data, from the monitoring result.

The present invention in aspect 24 is an information recording method for recording record marks corresponding to multilevel data on an optical disk with predetermined recording power with the use of recording pulses including a set of a top pulse, an off pulse and an erasure pulse, including: first step of reading recording power Pw and a ratio ϵ between erasure power Pe and recording power Pw, and recording parameters including the top pulse width Ton and the off pulse width Toff corresponding to the multilevel data, previously written in the optical disk; second step of test recording first test data with changing the top pulse width Ton, and monitoring the reflected light intensity corresponding to the first test data; third step of determining the optimum recording power from the monitoring result; fourth step of obtaining relational expression I=a·m+b between the multilevel data m and the reflected light intensity I, and calculating $r^2$ which is second power of a correlation coefficient r; fifth step of determining linearity between the multilevel data m and the reflected light intensity I with the use of the correlation coefficient $r^2$; sixth step of test recording the first test data with changing the top pulse width Ton with the use of the optimum recording power determined in the third step, and monitoring the reflected light intensity corresponding to the first test data; seventh step of determining the optimum top pulse width from the monitoring result; and eighth step of determining respective optimum off pulse widths Toff corresponding to the multilevel data, from the monitoring result of the optimum top pulse width determined in the seventh step.

The present invention in aspect 25 is an information recording method for recording record marks corresponding to multilevel data on an optical disk with predetermined recording power with the use of recording pulses including a set of a top pulse, an off pulse and an erasure pulse, including: first step of reading recording power Pw and a ratio ϵ between erasure power Pe and recording power Pw, and recording parameters including the top pulse width Ton and the off pulse width Toff corresponding to the multilevel data, previously written in the optical disk; second step of test recording first test data with changing the top pulse width Ton and the off pulse width Toff in sequence with the use of the read recording power and ratio ϵ, and monitoring the reflected light intensity corresponding to the first test data; and third step of determining the respective optimum top pulse width and optimum off pulse width corresponding to the multilevel data, from the monitoring result.

The present invention in aspect 26 is an information recording method for recording record marks corresponding to multilevel data on an optical disk with predetermined recording power with the use of recording pulses including a set of a top pulse, an off pulse and an erasure pulse, including: first step of reading recording power Pw and a ratio ϵ between erasure power Pe and recording power Pw, and recording parameters including the top pulse width Ton and the off pulse width Toff corresponding to the multilevel data, previously written in the optical disk; second step of test recording first test data with changing the off pulse width Toff in sequence with the use of the read recording power, ratio ϵ and top pulse width Ton, and monitoring the reflected light intensity corresponding to the first test data; third step of determining the respective optimum off pulse width corresponding to the multilevel data, from the monitoring result; fourth step of test recording second test data with changing the recording power in sequence with the use of the read ratio ϵ and the optimum off pulse width determined in the third step, monitoring the reflected light intensity corresponding to the second test data and determining the optimum recording power from the monitoring result.

The present invention in aspect 27 is an information recording method for recording record marks corresponding to multilevel data on an optical disk with predetermined recording power with the use of recording pulses including a set of a top pulse, an off pulse and an erasure pulse, including: first step of reading recording power Pw and a ratio ϵ between erasure power Pe and recording power Pw, and recording parameters including the top pulse width Ton and the off pulse width Toff corresponding to the multilevel data, previously written in the optical disk; second step of test recording first test data with changing the top pulse width Ton in sequence with the use of the read recording power, ratio ϵ and off pulse width Toff, and monitoring the reflected light intensity corresponding to the first test data; and third step of determining the respective optimum top pulse width corresponding to the multilevel data, from the monitoring result.

The present invention in aspect 28 is the information recording method in any one of aspects 21 through 27, wherein: the optimum parameters thus determined are recorded in a storage device of an information recording apparatus.

The present invention in aspect 29 is an information recording apparatus for recording record marks corresponding to multilevel data on an optical disk with predetermined recording power with the use of recording pulses including a set of a top pulse, an off pulse and an erasure pulse, including: first means for reading recording power Pw and a ratio ϵ between erasure power Pe and recording power Pw, and recording parameters including the top pulse width Ton and the off pulse width Toff corresponding to the multilevel data, previously written in the optical disk; second means for test recording first test data with changing the top pulse width Ton, and monitoring the reflected light intensity corresponding to the first test data; third means for determining the optimum recording power from the monitoring result; fourth means for obtaining relational expression I=a·m+b between the multilevel data m and the reflected light intensity I, and calculating $r^2$ which is second power of a correlation coefficient r; fifth means for determining linearity between the multilevel data m and the reflected light intensity I with the use of the correlation coefficient $r^2$; sixth means for test recording the first test data with changing the top pulse width Ton with the use of the optimum recording power determined by the third means, and monitoring the reflected light intensity corresponding to the first test data; seventh means for determining the optimum top pulse width from the monitoring result; and eighth means for determining respective optimum off pulse widths Toff corresponding to the multilevel data, from the monitoring result of the optimum top pulse width determined by the seventh means.

The present invention in aspect 30 is the information recording apparatus in aspect 29, wherein: the thus-determined optimum recording parameters are recorded in a storage device.

The present invention in aspect 31 is an optical disk for recording in a recording layer record marks corresponding to multilevel data with predetermined recording power with the use of recording pulses including a set of a top pulse, an off pulse and an erasure pulse, in such a manner that a reproduced signal level may change in multiple levels corresponding to the multilevel data, wherein: recording power Pw and a ratio $\epsilon$ between erasure power Pe and recording power Pw, and recording parameters including the top pulse width Ton and the off pulse width Toff corresponding to the multilevel data, are previously written therein.

In the invention in aspect 1, the optimum recording pulse width and the optimum recording power are obtained in the test recording, and then, user data is recorded. Accordingly, stable recording can be achieved without being affected by individual difference in the optical disk and the information recording apparatus or operation environment.

In the invention in aspect 2, the minimum necessary top pulse width for the reflected light intensity reaching the saturated value is determined as the optimum top pulse width in the test recording. Thus, thermal interference upon recording can be avoided, and the multilevel data can be precisely reproduced.

In the invention in aspect 3, in the approximate expression obtained from the test recording, the top pulse width by which the first order coefficient becomes minimum is determined as the optimum top pulse width. Thus, thermal interference upon recording can be avoided, and the multilevel data can be precisely reproduced.

In the invention in aspect 4, the off pulse width is determined for each multilevel data from the test recording result. Accordingly, stable recording can be achieved without being affected by individual difference in the optical disk and the information recording apparatus or operation environment.

In the invention in aspect 5, the off pulse width is determined for each multilevel data with the use of the approximate expression obtained from the test recording result. Accordingly, the off pulse width can be set with higher accuracy.

In the invention in aspect 6, relationship between the off pulse width and the reflected light intensity of the top pulse width with which test recording is not carried out is calculated with the use of the approximate expression obtained from the test recording result. Accordingly, the number of times of test recording can be reduced, and also, the top pulse width can be set with higher accuracy.

In the invention in aspect 7, the top pulse width is set in such a manner that the reflected light intensity with respect to the off pulse width becomes approximately linear. Accordingly, the reflected light intensity margin upon recording correction can be made equal.

In the aspect 8, trial writing is carried out after recoding pulse optimization is carried out by test recording, and recording power by which signal level deviation becomes minimum is determined as the optimum recording power. Accordingly, recording can be made such that multilevel data can be precisely reproduced therefrom.

In the aspect 9, setting is made such that each of both the top pulse width Ton(m) and the off pulse width Toff(m) corresponding to the multilevel data m are integer times of a unit time T. Thus, recording pulse series can be generated by a simple circuit using recording clock.

In the aspect 10, a wide margin can be provided to the off pulse width for setting the reflected light intensity level corresponding to the multilevel data at fixed intervals, and thus, recording pulse series inhibiting pulse width error can be achieved.

In the aspect 11, a wide margin can be provided to a combination of the top pulse width and the off pulse width for setting the reflected light intensity level corresponding to the multilevel data at fixed intervals, and thus, recording pulse series inhibiting pulse width error can be achieved, while the off pulse width linearity is maintained.

In the aspect 12, the same heating condition can be provided for a record mark sufficiently longer than the cell period, and thus, mark length variation can be inhibited.

In the aspect 13, the multilevel data recording pulse series setting items can be commonly applied to various sorts of phase change recording media. As a result, optimum recording pulse width setting can be achieved even by minimum necessary information. Thus, operation of calculating the optimum pulse width or calculating the optimum recording power can be shortened.

In the aspect 14, without using recording clock period which has excessive resolution with respect to cell clock period, a minimum necessary recording clock frequency is set, and record marks corresponding to the multilevel data can be produced.

In the aspect 15, setting is made such that the top pulse coefficient is increased for the record mark for a minimum level of reflected light intensity. Accordingly, linearity with the off pulse width can be maintained while dynamic range of the reflected light intensity is used widely.

In the aspect 16 or 17, the mark sufficiently smaller than the spot diameter can be produced with sufficient cooling. Accordingly, linearity between the mark length and the off pulse width can be maintained.

In the aspect 18 or 19, phase change material such as Ag—In—Sb—Te or such is used as recording material. Accordingly, mark shape can be controlled with a higher accuracy.

In the aspect 20, user data recording is carried out after the optimum recording pulse width and optimum recording power are obtained from the test recording. Accordingly, stable recording without being after by individual difference in the optical disk and/or the information recording medium or the operation environment can be carried out.

In the aspect 21, user data recording is carried out after the optimum recording power is obtained from the test recording. Accordingly, stable recording without being after by individual difference in the optical disk and/or the information recording medium or the operation environment can be carried out.

In the aspect 22, relationship between the multilevel data and the reflected light intensity is approximated by a quadratic expression, and linearity between the multilevel data and the reflected light intensity is determined from the second order coefficient. Accordingly, the determination can be easily achieved.

In the aspect 23, the optimum recording power is determined from the first test recording, then the optimum off pulse width is determined from the second test recording, and after that, user data recording is carried out. Thus, the recording parameters can be set with a high accuracy.

In the aspect 24, the optimum recording power is determined from the first test recording, then the optimum top pulse width and the optimum off pulse width are determined from the second test recording, and after that, user data recording is carried out. Thus, the recording parameters can be set with a high accuracy.

In the aspect 25, the optimum top pulse width and the optimum off pulse width are determined from the test recording, and after that, user data recording is carried out. Thus, the recording parameters can be set with a high accuracy. Accordingly, stable recording can be carried out without being affected by individual difference of the optical disk and the information recording apparatus or the operation environment.

In the aspect 26, the optimum off pulse width corresponding to the multilevel data is determined from the test recording, then the optimum recording power is determined from the second test recording, and after that, user data recording is carried out. Thus, stable recording can be carried out without being affected by individual difference of the optical disk and the information recording apparatus or the operation environment.

In the aspect 27, the optimum top pulse width is determined from the test recording, and after that, user data recording is carried out. Thus, stable recording can be carried out within a short time period without being affected by individual difference of the optical disk and the information recording apparatus or the operation environment.

In the aspect 28, the recording parameters determined from the test recording are recorded in the storage device of the information recording apparatus. Then, when recording is carried out subsequently, recording parameters are set based on the information. Thus, the recording parameters can be optimized within a short period.

In the aspect 29, the optimum recording power is determined from the first test recording, then the optimum top pulse width and the optimum off pulse width are determined from the second test recording, and after that, user data recording is carried out. Thus, the recording parameters can be set with a high accuracy.

In the aspect 30, the recording parameters determined from the test recording are recorded in the storage device of the information recording apparatus. Then, when recording is carried out subsequently, recording parameters are set based on the information. Thus, the recording parameters can be optimized within a short period.

In the aspect 31, at least the recording power Pw, the ratio $\epsilon$ between the erasure power Pe and the recording power Pw, and the top pulse width Ton and the off pulse width Toff corresponding to the multilevel data are recorded in the optical disk previously. Accordingly, by reproducing them, initial values of the recording parameters can be set.

Other objects and further features of the present invention will become more apparent from the following detailed description when read in conjunction with the accompanying drawings:

DETAILED DESCRIPTION OF THE PREFERRED EMBODIMENTS

A best mode for embodying the present invention is described now with reference to figures.

First Embodiment

First, multilevel data recording/production in an information recording method according to the present invention is described. In order to produce multilevel data, mainly, proper recording pulses should be obtained. Specifically, generally speaking, test recording is carried out, and, from a result of monitoring this, recording pulse conditions by which, thermal interference can be well controlled upon recording, and a deviation in a reproduced signal becomes minimum, are determined.

Figure 1:
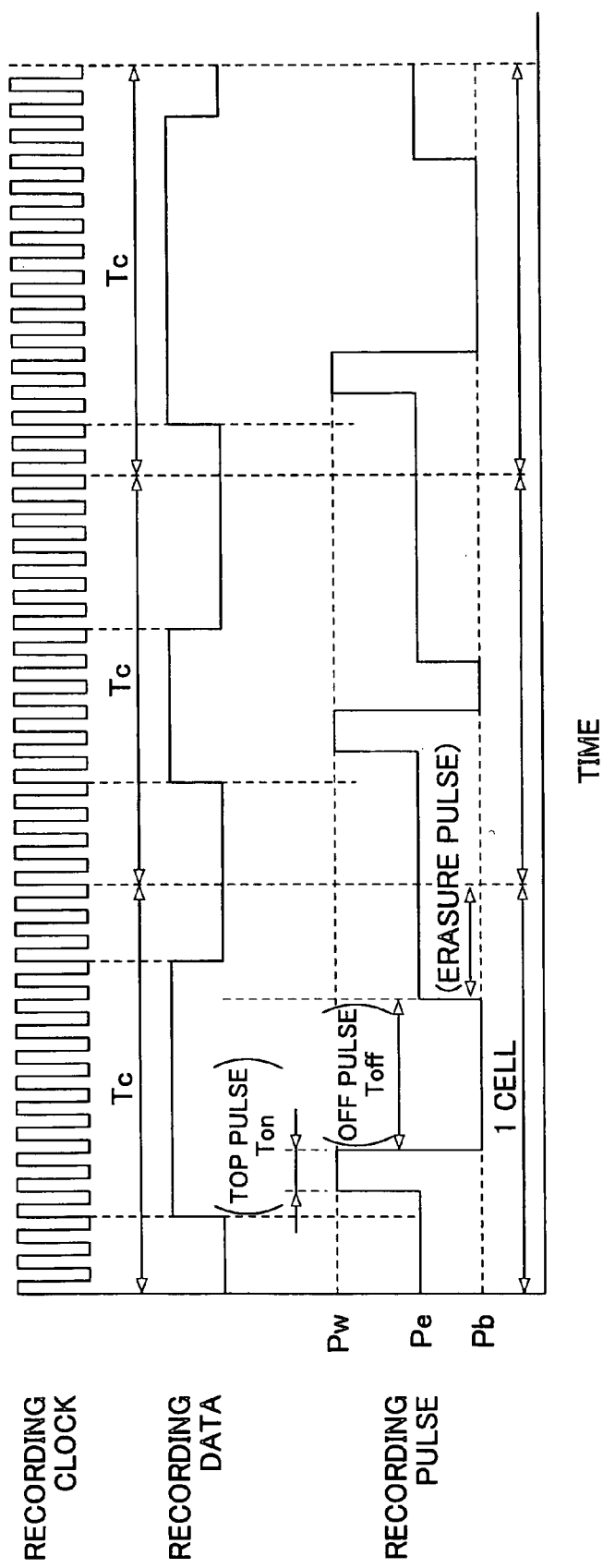
FIG. 1 is a waveform diagram showing multilevel recording pulse series applied in an embodiment of the present invention.

As shown in FIG. 1, one cell of recording pulses includes one set of a top pulse, an off pulse and an erasure pulse. Reflected light intensity is controlled by a top pulse width Ton, an off pulse width Ton, recording power Pw and erasure power Pe.

Figure 2:
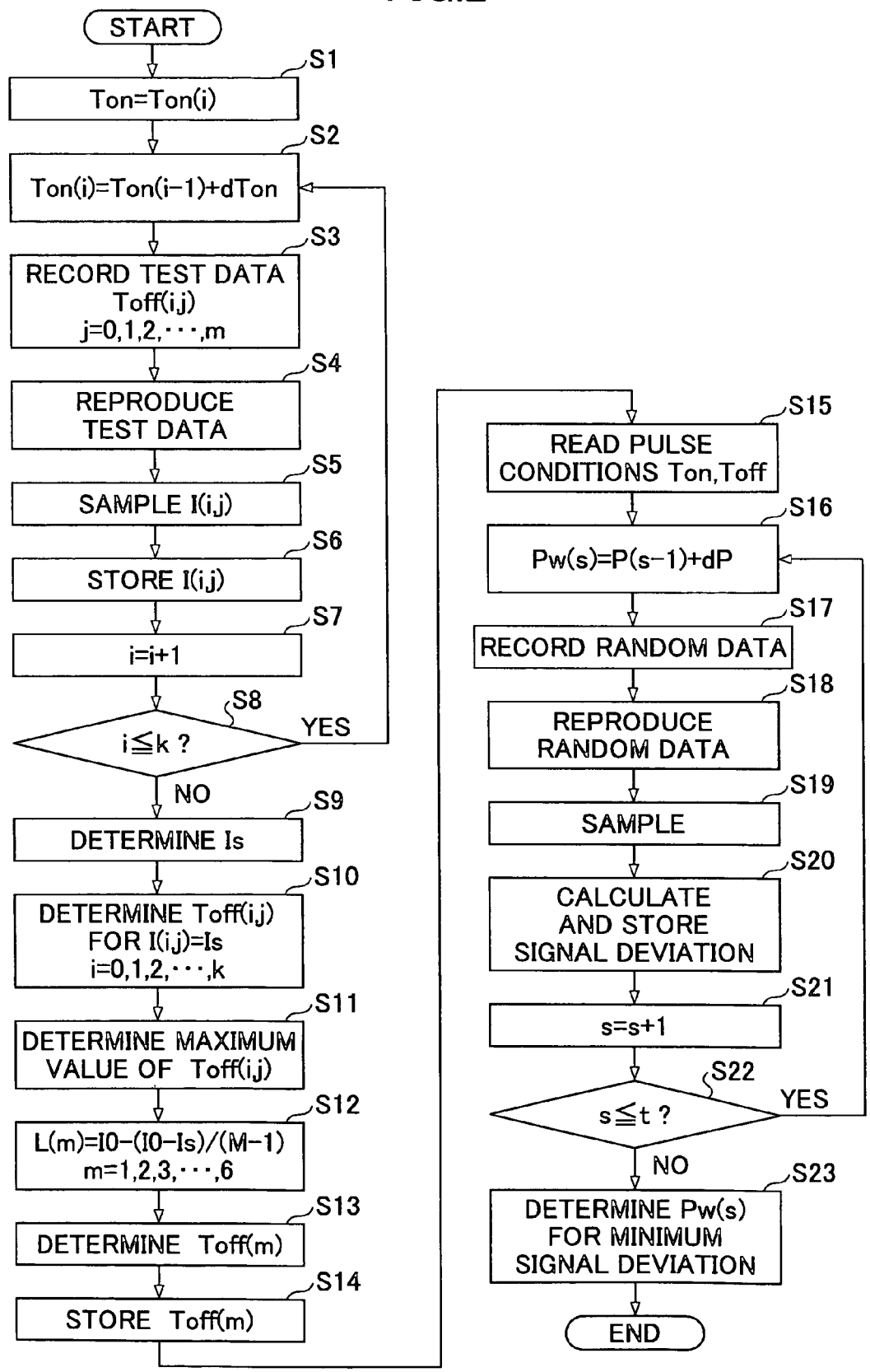
FIG. 2 is a general flow chart showing a recording condition setting processing example in a first embodiment of the present invention.

A procedure for obtaining recording characteristics required for selecting optimum recording pulse widths is described now with reference to a general flow chart of FIG. 2. This procedure is carried out by a computer included in an information recording apparatus (optical risk apparatus). In this case, a program of causing the computer to execute this procedure may be produced, then stored in a predetermined recording medium such as a CD-ROM, or loaded from a communication network such as the Internet, and installed in the computer, and then, executed by the computer.

First, the top pulse width Ton is set in an initial value Ton(i) (Step S1), and then, test recording is carried out (Steps S2 through S8).

Figure 3:
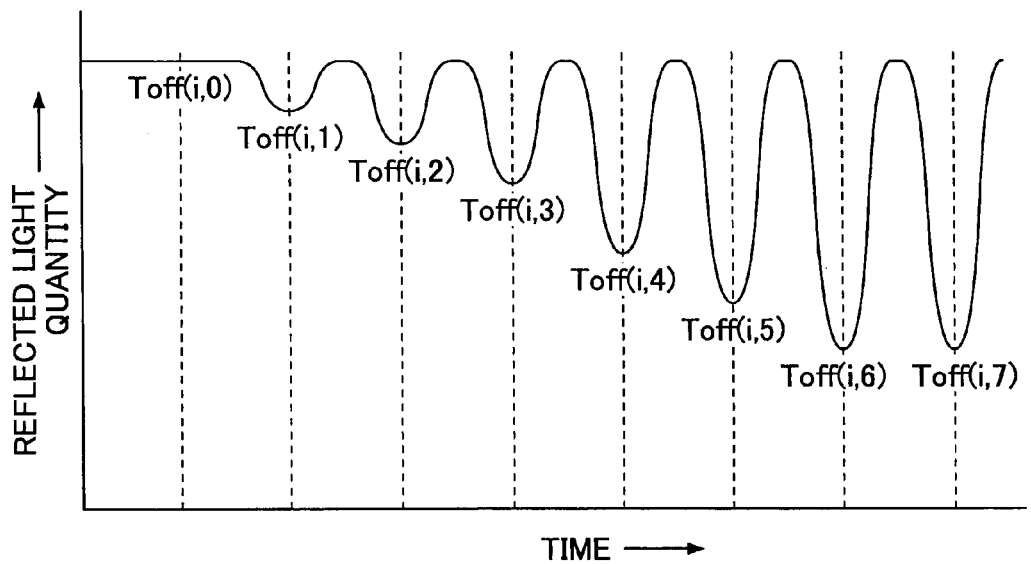
FIG. 3 is a characteristic diagram showing a result of investigating reflected light intensity change with respect to the off pulse width while the off pulse width is made to correspond to the multilevel data.

In the test recording, first, as the top pulse width Ton=Ton (1), first test data is recorded/reproduced (Steps S2, S3 and S4), and a reproduced signal is sampled (Step S5). For example, as shown in FIG. 3, it is preferable that, as the first test data, the off pulse Toff(1,m) ("1" means Ton(1)) is made to correspond to each multilevel data m. Thereby, a change in the reflected light intensity I for the off pulse width Toff can be easily measured.

Figure 4:
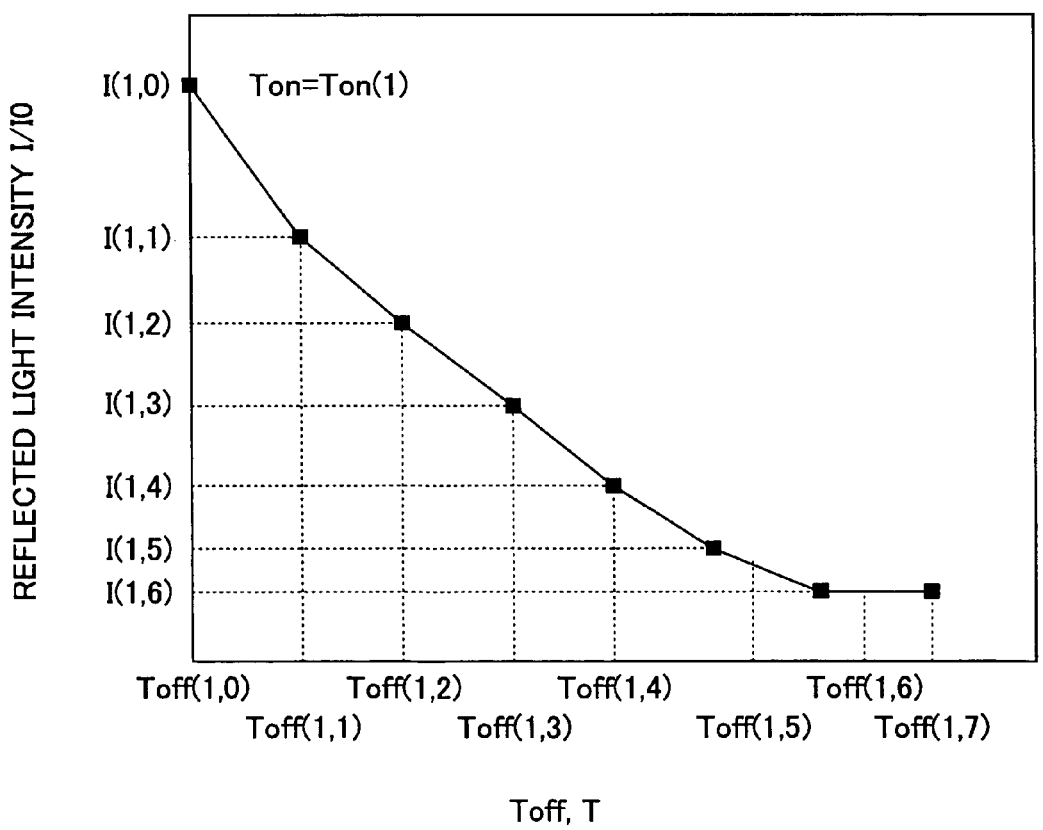
FIG. 4 is a characteristic diagram showing a result of investigating a change in the reflected light intensity with respect to the off pulse width.

FIG. 4 shows the result. FIG. 4 shows values obtained from normalization of the reflected light intensity obtained as shown in FIG. 3 by I0, when Ton(1) is fixed and the off pulse width is changed in sequence (Step S3). I0 denotes the reflected light intensity upon not yet recorded. In this example, the reflected light intensity obtained when recording is made in such a manner that the Toff(1,m), i.e., the on pulse width is fixed in Ton(1), and the off pulse width is changed in sequence to correspond to the multilevel 0 through 7 (m=0, 1, 2, ..., 7), is I(1,m). I(1,m) thus obtained is stored in the storage device (Step S6).

Next, in Step S7, i defining the top pulse width is incremented. Then, the above-mentioned trial writing reflected light intensity measurement (Steps S2 through S6) is carried out thoroughly for the top pulse width of Ton(2) at this time.

Figure 5:
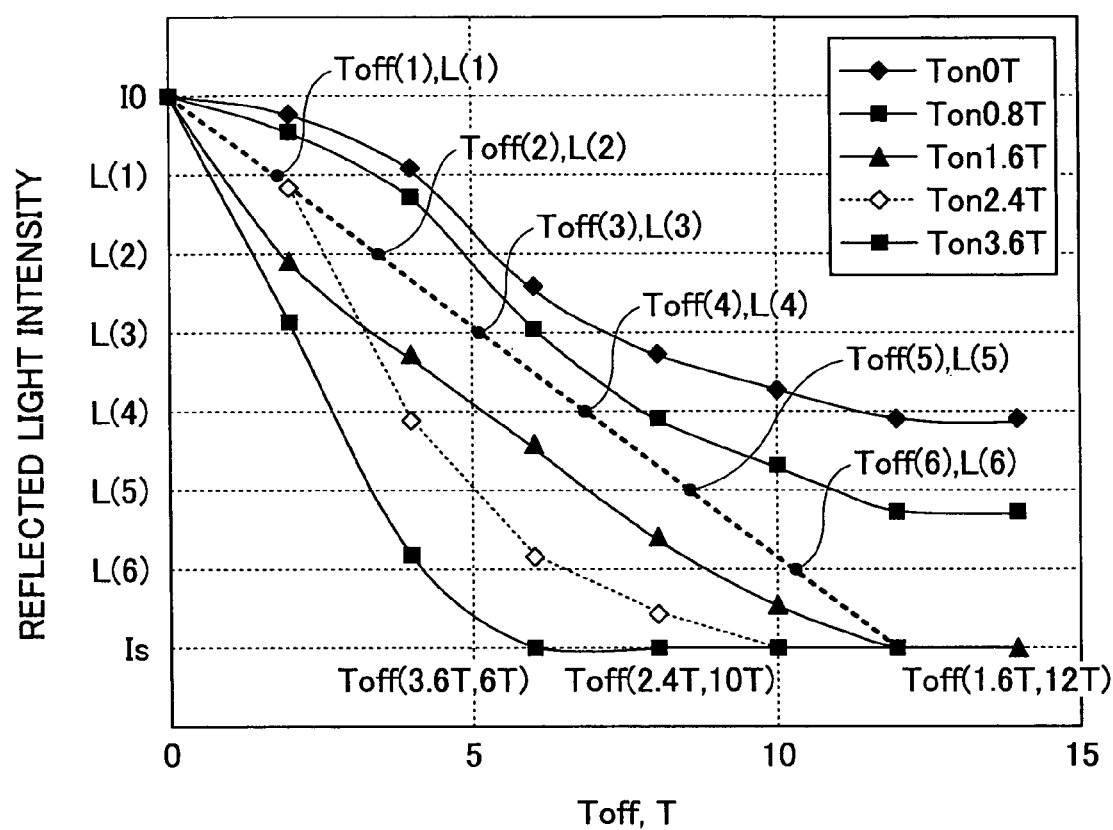
FIG. 5 is a characteristic diagram showing a result of repeating a plurality of times the test recording and reflected light intensity measurement.

This is repeated predetermined times (in this case, i=1 thorough k, and thus, total k times) (Steps S2 through S8). As a result, k (in this example, i=1 through 8, thus, total 8) graphs of FIG. 4 are obtained as a result of the top pulse width is increased in sequence, i=1 through k. FIG. 5 shows a result of the top pulse width being changed in total five steps of Ton0T, Ton0.8T, Ton1.6T, Ton2.4T and Ton3.6T. Each curve shown in FIG. 5 illustrates a change in the reflected intensity obtained from recording results obtained from recording in such a manner that the top pulse width Ton is fixed in each of Ton0T, Ton0.8T, Ton1.6T, Ton2.4T and Ton3.6T, and the off pulse width is changed in sequence to correspond to the multilevel m=0 through 7 for each top pulse width.

The recording power used at this time is optimum recording power stored in the optical disk or the optical disk apparatus as a temporary condition. The processing of Step S2 through S8 is executed as the first step or the first means of carrying out test recording with changing the top pulse width Ton in sequence and monitoring the reflected light intensity corresponding to the first test data.

Next, the optimum top pulse width Ton is determined (Steps S9 through S11). A first method of determining the optimum top pulse width Ton is that, from FIG. 5 obtained through Steps S2 through S8, a level Is at which the reflected light intensity is saturated is detected (Step S9), and then, Toff(i,j) at which I(i,j) reaches Is thus obtained is obtained (Step S10).

In the example of FIG. 5, Is is reached at three points, i.e., Toff(1.6T,12T), Toff(2.4T,10T) and Toff(3.2T,6T). That is, the off pulse width is 12T when, on the curve of the top pulse width Ton1.6T, the reflected light intensity reaches the above-mentioned saturation value Is. Correspondingly, the off pulse width is 10T when, on the curve of the top pulse width Ton2.4T, the reflected light intensity reaches the above-mentioned saturation value Is, and the off pulse width is 6T when, on the curve of the top pulse width Ton3.6T, the reflected light intensity reaches the above-mentioned saturation value Is (Toff(3.6T,6T)).

From among these three conditions, the pulse condition in which the off pulse width of reaching the saturation level Is is long, i.e., the shortest top pulse width is determined as the optimum top pulse width (Step S11). In this example, Toff (1.6T,12T) corresponds to it, and the optimum top pulse width is selected as 1.6T. The processing of Steps S9 through S11 is executed as the second step or second means of determining the optimum top pulse width Ton from the monitoring result. This is for the purpose of, as described in the problem to solve, well controlling thermal interference.

As a second method of determining such an optimum top pulse width, a Toff-reflected light intensity curve such as that shown in FIG. 5 may be approximated by a cubic function. Characteristics are obtained such that the top pulse width condition by which the first order coefficient of the approximate becomes minimum, that is, the condition in which the slope of the curve is small is obtained as the optimum top pulse width. In the example of FIG. 5, the approximate expression is obtained as follows:

$$I = a \cdot Toff^3 + b \cdot Toff^2 + c \cdot Toff + d$$

Assuming that I=y and Toff=x, for Ton=1.6T, $$y = 0.00003x^3 + 0.0021x^2 - 0.0775x + 0.9897$$

Accordingly, the first order coefficient is obtained as 0.0775. Next, for Ton=2.4T, $$y = 0.0004x^3 + 0.0017x^2 - 0.085x + 1.02$$

Accordingly, the first order coefficient is obtained as 0.085. Next, for Ton=2.4T, $$y = 0.0005x^3 + 0.0174x^2 - 0.1845x + 1.0143$$

Accordingly, the first order coefficient is obtained as 0.1845. As a result, since the absolute value of the first order coefficient is minimum for Ton=1.6T, Ton=1.6T is obtained as a typical value of the optimum recording pulse width.

It is noted that the above-mentioned curve approximation is carried out, for example, according to a least square method. The same manner will be applied also for other curve approximation in each embodiment of the present invention.

Next, allocation of the reflected light intensity corresponding to the multilevel data is carried out (Step S12). Specifically, within a range of the above-mentioned I0 and Is at which the reflected light intensity becomes maximum and minimum, the reflected light intensity corresponding to the multilevel data is determined. For a case of M-level recording (M: an integer not less than 2), the reflected light intensity L(m) as a target value of the multilevel data m is calculated from the following formula (the reflected light intensity corresponding to the multilevel data 0, 7 is I0, Is, respectively):

$$L(m) = I0 - (I0 - Is)/(M-1)$$

L(1) through I(6) are the reflected light intensity thus obtained to correspond to the multilevel data.

Next, the off pulse width Toff corresponding to the reflected light intensity I thus obtained is determined (Steps S13 through S14). That is, with the use of the trial writing monitoring result with the optimum top pulse Ton determined in the above-described second step (Steps S9 through S11), the off pulse width Toff for obtaining the reflected light intensity calculated in the third step (Step S12) is selected.

The following method can be cited as a method of determining the off pulse width.

(a) Method of Interpreting Linearly:

The off pulse width recording each multilevel data m is referred to as Toff(m), and the reflected light intensity thus obtained is referred to as I(m), and a coefficient is referred to as α. At this time, the optimum off pulse width Toff opt(m) corresponding to the multilevel data m is obtained from the following relational expression for the reflected light intensity L(m) corresponding to each multilevel data m:

$$Toff\ opt(m) = \alpha \cdot (I(m) - L(m))/(I(m+1) - I(m))/(Toff(m+1) - Toff(m)) + Toff(m).$$

(b) Method of Using an Approximate Expression to Set Toff(m):

The approximate expression obtained in the above-described second step (Steps S9 through S1):

$$I = a \cdot Toff^3 + b \cdot Toff^2 + c \cdot Toff + d$$

is used, and Toff(m) for obtaining the reflected light intensity corresponding to the multilevel data m is obtained. In this method, the pulse width can be obtained more precisely than that in the above-mentioned method (a).

The processing of Steps S13 through S14 is executed as the third step or third means of determining each optimum off pulse width Toff corresponding to the multilevel data.

Finally, the optimum recording power is determined (Step S15 through S23). That is, with the use of the recording pulse conditions obtained in the above-mentioned procedure (Step S14), the recording power Pw(s) is changed in sequence, and already known multilevel random data is recorded/reproduced (Steps S15, S16 and S17). Then, deviation in the reflected light intensity of each multilevel data thus sampled is calculated for each multilevel data m (Steps S18, S19). Then, the recording power Pw(s) with which the deviation in the reflected light intensity of each value of the multilevel data becomes minimum is determined as the optimum recording power (Step S22).

Thus, according to the present embodiment, user data recording is carried out basically after the optimum recording pulse widths (top pulse and off pulse) and the optimum recording power are determined in the test recording. As a result, stable recording can be carried out without being affected by individual difference of the optical disk and the information recording apparatus or the operation environment.

Second Embodiment

According to the second embodiment of the present invention, the top pulse width is set for multilevel data in such a manner that the off pulse width becomes linear with respect to the multilevel data. Thereby, the off pulse width adjustment margin is ensured.

Figure 9:
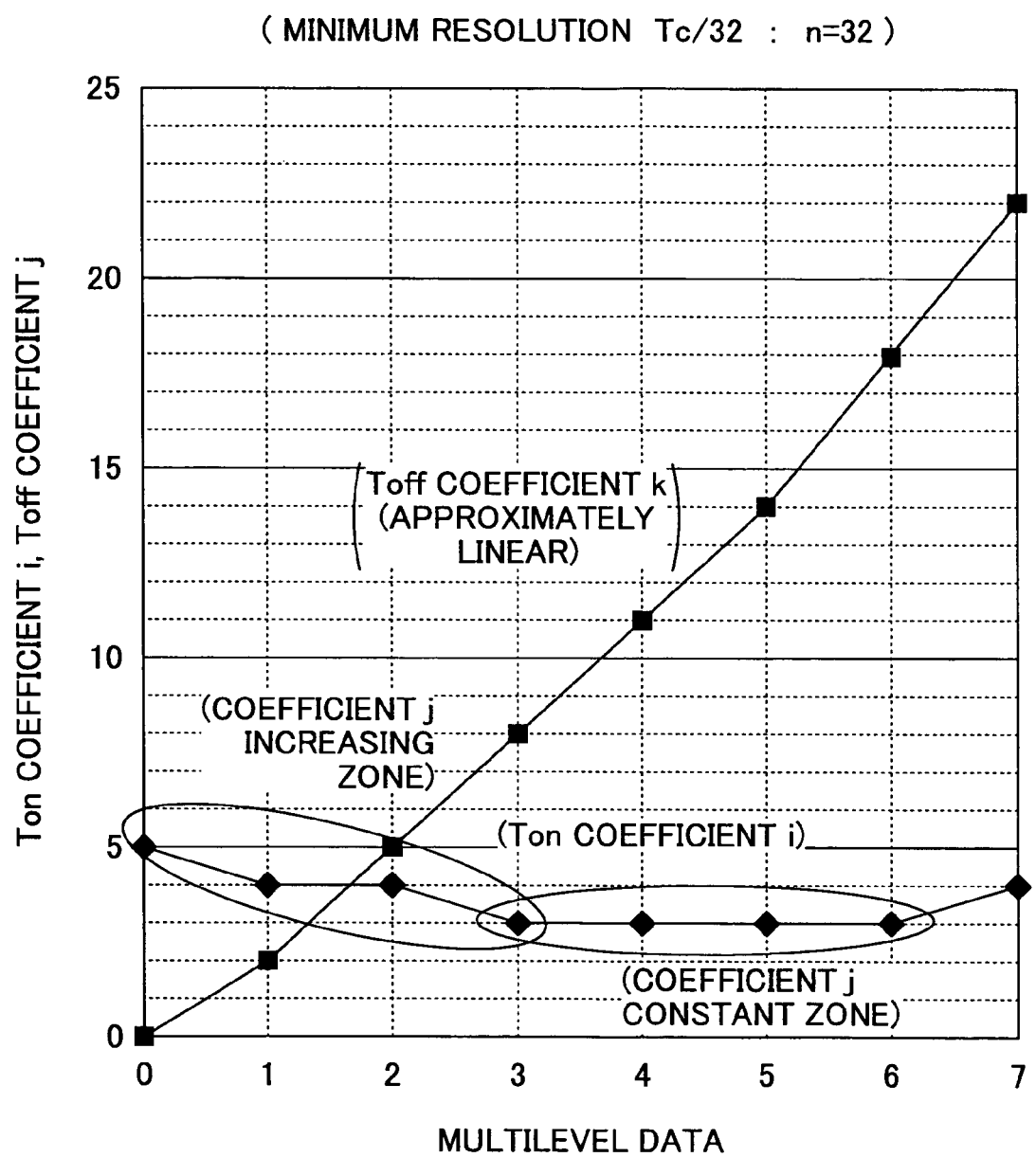
FIG. 9 is a characteristic diagram showing one example of how to change the top pulse coefficient j and the off pulse coefficient k for a case of a minimum resolution Tc/32.
Figure 10:
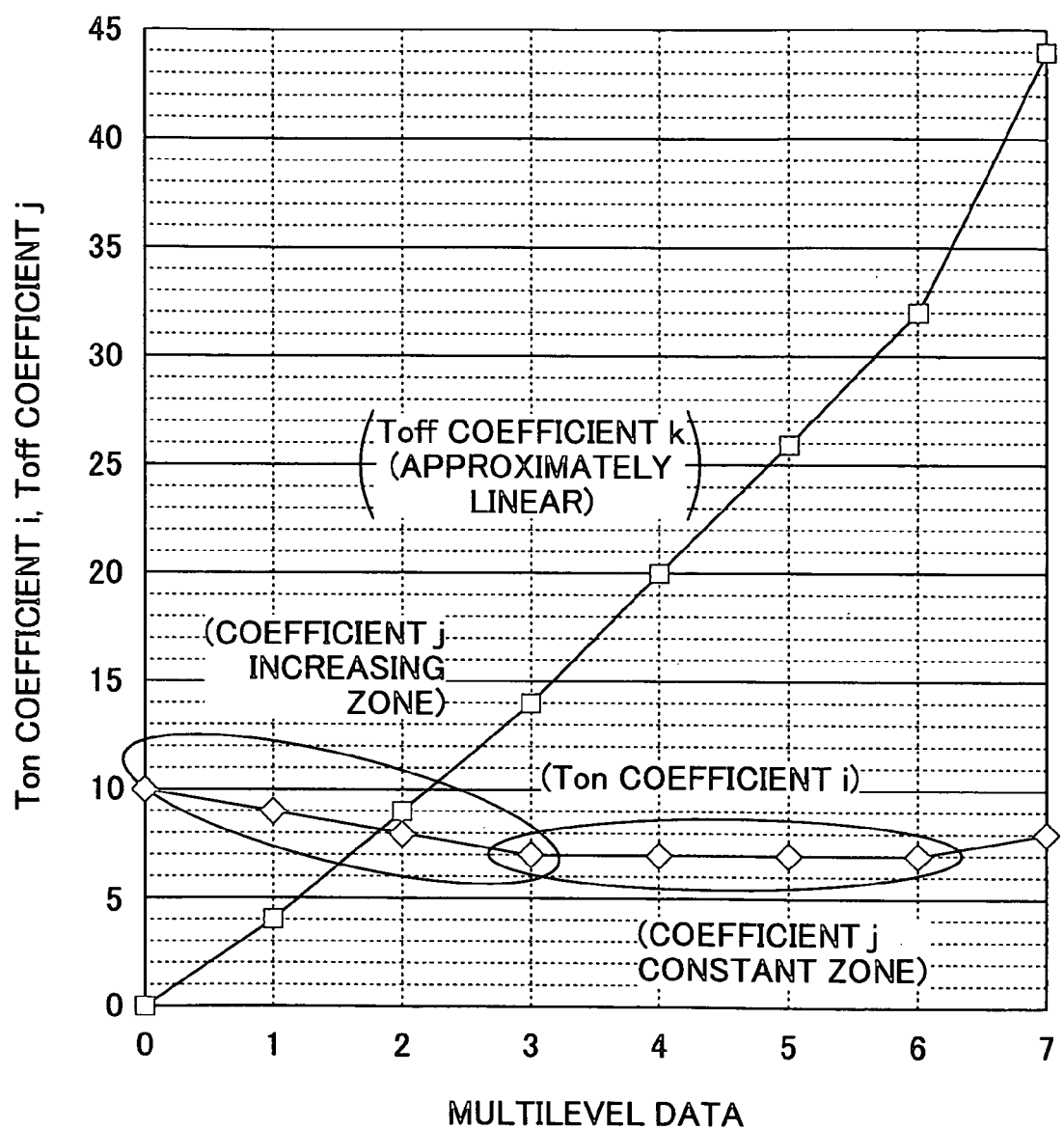
FIG. 10 is a characteristic diagram showing one example of how to change the top pulse coefficient j and the off pulse coefficient k for a case of a minimum resolution Tc/64.

For example, for wavelength 405 nm; NA: 0.65; and cell length: 0.28 μm, as shown in FIGS. 9 and 10, the top pulse width is increased (the top pulse coefficient is increased) when each mark of multilevel data 0, 1, 2 is produced.

The details are described now. An optical disk in the present embodiment is a phase change type optical disk for which recording by laser light of wavelength 405 nm is possible. A substrate is made of polycarbonate of diameter 120 mm and thickness 0.6 mm, and grooves are produced on the substrate surface by injection molding. A track pitch is 0.46 μm, and a continuous spiral is produced from an inner circumference through an outer circumference. On the substrate, a dielectric film, a phase change recording film, a dielectric film and a reflective film are produced in sequence, and thus, the phase change type optical disk is produced.

Figure 6:
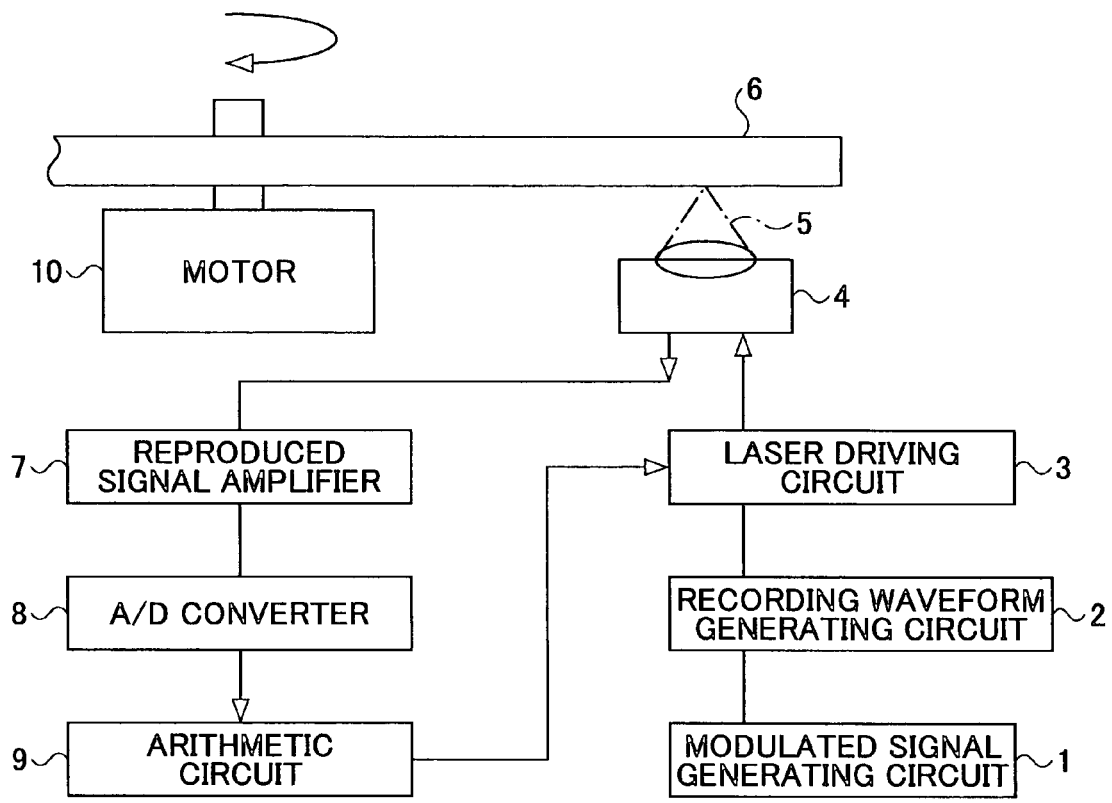
FIG. 6 is a block diagram showing a general configuration example of an optical disk apparatus according to a second embodiment of the present invention.

An information recording apparatus according to the present embodiment is described now with reference to FIG. 6. FIG. 6 is a block diagram showing a general configuration example of an optical disk apparatus which is the information recording apparatus in the present embodiment (the same also for the other embodiments).

When information is recorded, first, information is output from a modulated signal generating part 1, and is input to a recording waveform generating circuit 2. The recording waveform generating circuit 2 outputs recording pulses according to the modulated signal. This is input to a laser driving circuit 3, and a semiconductor laser provided in a pickup head 4 driven by the laser driving circuit 3 emits laser light. The laser light is condensed on the optical disk 6 by means of an objective lens 5, and therewith, record marks are produced.

Upon reproduction, reflected light from the optical disk 6 is taken in a light receiving part provided in the pickup head 4, and it is transformed into an electric signal. The electric signal passes through a reproduced signal amplifier 7, and is input to an A/D converter 8. In an arithmetic circuit 9, arithmetic operation is carried out for recording pluses, recording power and so forth based on a digital signal obtained from the A/D converter 8, and inputs the operation results to the laser driving circuit 3. A part to which a reference numeral 10 is given is a spindle motor rotates and drives the optical disk 6.

When data recording/reproduction is carried out, the optical disk apparatus of wavelength 405 nm and the objective lens 5 of NA0.65 is used. A recording/reproduction linear velocity is 3.6 m/s, recording clock period T=4.86 ns, a circumferential length for one cell is 0.28 μm (=16T), recording power Pw=7.8 mW, erasure power Pe=4.9 mW and bias power Pb=0.1 mW.

As a method of setting recording conditions, first, the following recording/reproduction characteristics were checked. That is, from test recording results such as these shown in FIG. 5, for each top pulse width Ton, the off pulse width Toff(m) from which reflected light intensity L(m) is obtained for each multilevel data m was obtained. Then, in the set conditions, already known random data was recorded on the optical disk 6.

Figure 7:
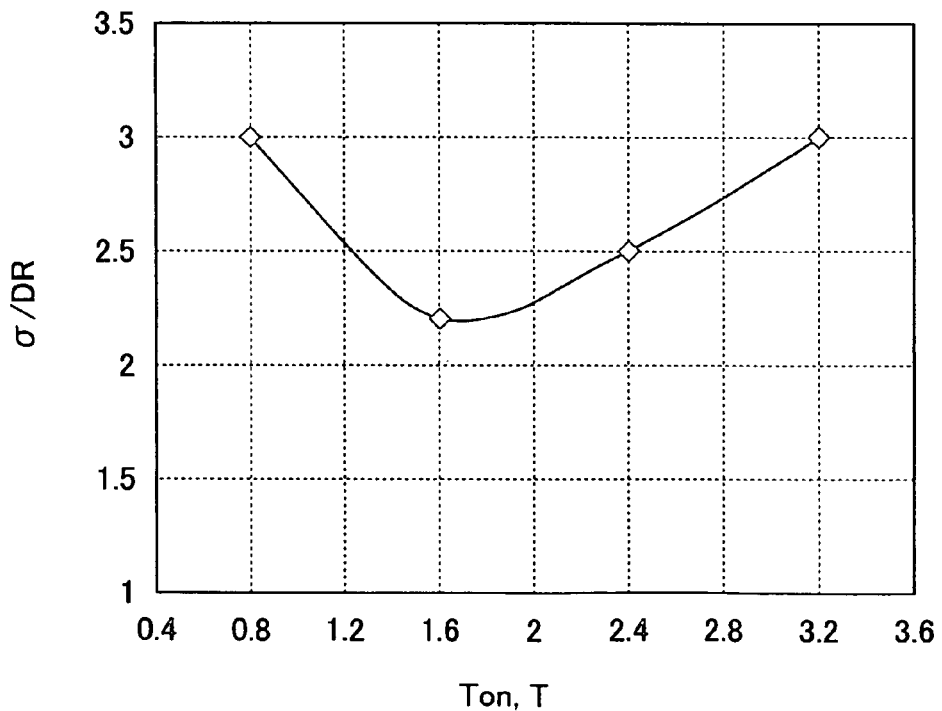
FIG. 7 is a characteristic diagram showing relationship between the top pulse width and $\sigma/DR$.

FIG. 7 shows σ/DR top pulse width dependency. σ/DR is a value normalized from the reflected light intensity, σ is a value averaged from the reflected light intensity deviation for each multilevel data calculated from the reproduction result, and DR is the maximum reflected light intensity I0—the saturated reflected light intensity Is. From characteristics of FIG. 7, it is seen that the deviation of a signal level around T=1.6T is minimum. By selecting Ton which is minimum one from among the top pulse widths for the reflected light intensity reaching the saturated level Is, thermal interference can be inhibited, and satisfactory signal quality can be obtained.

In the above-described first embodiment, the reflected light intensity from the record marks are modulated by changing the off pulse width Toff while the top pulse width is fixed. In the present second embodiment, in order to obtain further optimum setting, the top pulse width Ton (top pulse coefficient) is particularly set for each value of the multilevel data m in such a manner that a change in the reflected light intensity corresponding to the multilevel data m becomes linear with respect to the off pulse width Toff (as shown in FIGS. 9 and 10, for example).

In the present embodiment, a case is assumed in which multilevel recording is carried out on an optical disk for which a sufficient reproduction margin cannot be ensured. That is, for the optical disk for which recording correction such as that in the prior art should be carried out, the reflected light intensity margin can be ensured as a result of recording pulse conditions being set such that the off pulse width intervals are approximately equal among the respective values of the multilevel data as an initial recording pulse condition.

A pulse condition setting method according to the present embodiment is described now:

First, test recording such as that described in Steps S2 through S8 of FIG. 2 is carried out as in the case of the first embodiment, and monitoring results such as those of FIG. 5 are obtained.

Next, the off pulse width Toff for the multilevel data "7" (m=7) is determined. There, the off pulse width for the reflected light intensity I reaching the saturated value upon the optimum top pulse width Ton determined in the second step (Steps S9 through S11) of the first embodiment, is determined as Toff of the multilevel data 7. In the example of FIG. 5, as mentioned above, the optimum top pulse width Ton=1.6T, and thus, Toff=12T is obtained as the off pulse width for the reflected light intensity in this case reaching the saturated value Is.

Then, as in the first embodiment, a curve obtained upon each top pulse width Ton is approximated (for example, by a cubic function). Next, with the use of this result, coefficient of each approximate expression is then approximated as a function of the top pulse width Ton. Then, with the use of the thus-obtained approximate expression of each coefficient, a Toff-reflected light intensity curve for a top pulse width Ton for which test recording has not been carried out is obtained in an approximation manner.

With the use of the calculation results, the off pulse width for each multilevel data is set. That is, a crossing point between a straight line (broken line in FIG. 5) connecting between the reflected light intensity I0 and the saturated value Is (Toff=12T) in a not-yet-recorded condition, and the reflected light intensity L(m) level corresponding to each m of the multilevel data set in the third step (Step 12) in the first embodiment, is the off pulse width Toff(m) of the multilevel data m (see FIG. 5).

Next, the top pulse width Ton is determined. That is, the top pulse width for obtaining L(m) upon the Toff(m) obtained as mentioned above is calculated with the use of the approximate expression:

$$I(m)=a \cdot Toff(m)^3 + b \cdot Toff(m)^2 + c \cdot Toff(m) + d$$

described in the third step (Step 12) of the first embodiment.

This is carried out for the multilevel data 1 through 6 (m=1 through 6).

Figure 8:
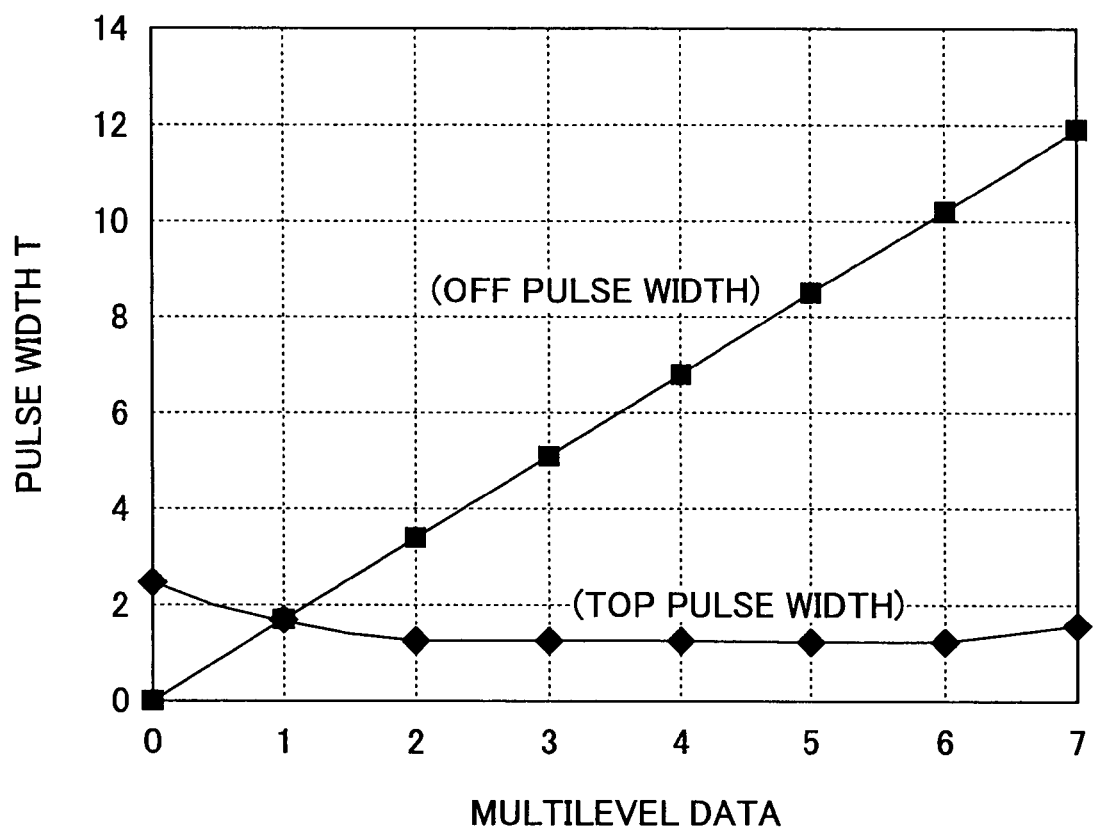
FIG. 8 is a characteristic diagram showing a set recording pulse condition example.

FIG. 8 shows the recording pulse conditions set in this method. in FIG. 8, the abscissa axis is multilevel data m, and the ordinate axis is pulse width T. As can be seen from FIG. 8, by adjusting the top pulse width Ton, it is possible to set the off pulse width Toff at equal intervals (linear with respect to the multilevel data) for the multilevel data.

Table 1 below shows a result of comparison of σ/DR when each recording correction was carried out and multilevel random data was recorded, between before and after the recording correction. Configurations of the optical disk and the optical disk apparatus in this case were those described above. As can be seen from the table, the recording pulse condition 1 (the condition of the first embodiment) has a smaller deviation before the recording correction. However, when comparison is made after the recording correction, the deviation can be reduced rather for the recording pulse condition 2 (the condition in the second embodiment). Accordingly, when recording is made on the optical disk for which recording correction should be carried out for widening the reproduction margin, it is preferable that pulse conditions such as those in the second embodiment are used as initial recording pulse conditions in which change in the reflected light intensity corresponding to the multilevel data becomes linear.

TABLE 1

|  | BEFORE CORRECTION | AFTER CORRECTION |
| --- | --- | --- |
| RECORDING PULSE CONDITION 1 | 2.4% | 2.1% |
| RECORDING PULSE CONDITION 2 | 2.6% | 1.9% |

In order to apply the above-described recording/reproduction characteristics in the optical disk apparatus, configurations of recording pulses are set in the following manner:

That is, a record mark corresponding to each value of the multilevel data has a smaller size than a shortest mark in binary recording in the prior art, and thus, a recording power width and a cooling pulse width should be set with a high accuracy with checking a detection level of reflected light intensity of a mark portion. Especially, a case may occur in which, for a mark level 0 (maximum detection light quantity) or a mark level 7 (minimum), linearity remarkably degrades, and extremely narrow pulse width or extremely wide pulse width setting occur.

According to the present embodiment, when a phase change type optical recording medium employing Sb—Te family recording material is used, the following setting is made:

In order to set a minimum resolution pulse width by a simple circuit, a 16 through 64 multiplied recording clock can be generated with the use of a PLL or a ring oscillator, with the use of a cell clock as a reference clock. By configuring recording pulses in synchronization with the recording clock period, generation of a recording waveform corresponding to each multilevel data can be made easier.

In the configuration of FIG. 1, the recording clock period is 1/16 of the cell period Tc. However, when the top pulse width Ton and the off pulse width Toff set in the basic configuration are set with the 16 multiplied clock period, pulse width setting resolution is not sufficient, and it is difficult that the reflected light intensity level corresponding to the multilevel data is made linear. Therefore, in order to set the pulse widths obtained from the approximate expression as mentioned above, it is necessary to generate a 128 multiplied or 256 multiplied clock of the cell clock, and to set the high resolution minimum pulse width.

According to the present embodiment, basically, setting is made in such a manner that both the top pulse width Ton(m) and the off pulse with Toff(m) corresponding to the multilevel data m become integer times of the unit time T; recording pulse configuration is obtained from a synchronization circuit of a 32 multiplied clock or a 64 multiplied clock of the cell period Tc; and a minimum pulse resolution is obtained by a unit time Tc/n obtained from dividing by n (n is a fixed value) of the cell period Tc.

In details, when the coefficient of the top pulse width Ton is referred to as a top pulse coefficient j (j is an integer) and the coefficient of the off pulse width Toff is referred to as an off pulse coefficient k (k is an integer), setting of each pulse width Ton/Toff is made by setting of the respective coefficients j and k in the following expressions:

$$Ton = j \times Tc/n$$

$$Toff = k \times Tc/n$$

$$(n=32 \text{ or } 64)$$

From relationship between the pulse widths and the reflected light intensities obtained from the procedure of test recording and determining of the optimum pulse widths, a combination of the above-mentioned top pulse coefficient j and the off pulse coefficient k for obtaining the reflected light intensity corresponding to the multilevel data is selected. At this time, in order to minimize an influence of thermal interference of adjacent marks, the selections of combinations are made in such a manner that change in these coefficients j and k may become linear as much as possible.

Table 2 below shows setting values of the top pulse width Ton and the off pulse width Toff for obtaining the reflected light intensities of the respective values of the multilevel data with the minimum resolution of T'=Tc/32 of the 32 multiplied clock period:

TABLE 2

MINIMUM RESOLUTION Tc/32: n = 32

| MULTILEVEL | Ton COEFFICIENT j | Toff COEFFICIENT k |
| --- | --- | --- |
| 0 | 5 | 0 |
| 1 | 4 | 2 |
| 2 | 4 | 5 |
| 3 | 3 | 8 |
| 4 | 3 | 11 |
| 5 | 3 | 14 |
| 6 | 3 | 18 |
| 7 | 4 | 22 |

Next, Table 3 shows setting values of the top pulse width Ton and the off pulse width Toff for obtaining the respective multilevel levels with the minimum resolution of T'=Tc/64 of the 64 multiplied clock period:

TABLE 3

MINIMUM RESOLUTION Tc/64: n = 64

| MULTILEVEL | Ton COEFFICIENT j | Toff COEFFICIENT k |
| --- | --- | --- |
| 0 | 10 | 0 |
| 1 | 9 | 4 |
| 2 | 8 | 9 |
| 3 | 7 | 14 |
| 4 | 7 | 20 |
| 5 | 7 | 26 |
| 6 | 7 | 32 |
| 7 | 8 | 44 |

As shown in FIGS. 9 and 10, in order to obtain the multilevel data accuracy by increasing the off pulse width (Toff coefficient) k approximately linearly, the top pulse coefficient (Ton coefficient) j should be increased for record marks for the reflected light intensity indicating the maximum level through approximately a medium level (that is, a part having smaller values of the multilevel data; a left side part of the figure).

Further, the top pulse coefficient (Ton coefficient) j is made identical for record masks for the reflected light intensity indicating not more than the medium level (that is, a part having larger value of the multilevel data; a right side part). Further, for the minimum level of the reflected light intensity (multilevel 7), the top pulse coefficient (Ton coefficient) j is increased in order to maintain the off pulse coefficient (Toff coefficient) k linear. However, for the multilevel data 7, the top pulse coefficient (Ton coefficient) j may be made identical although the linearity of the off pulse coefficient (Toff coefficient) k may degrade. Either setting may be used.

By carrying out setting of the top pulse width and the off pulse width in such a manner, the record marks corresponding to the multilevel data can be produced with the minimum necessary recording clock frequency without using an excessively multiplied clock with respect to the cell clock. Accordingly, for a further higher recording speed, minimum resolution for pulse width setting can be easily obtained.

Third Embodiment

It is seen that a record mark length at which linearity with respect to the off pulse width is lost depends on the recording spot diameter and, this is around ¼ of the spot diameter, from an experimental result. Accordingly, in the third embodiment of the present invention, when multilevel data at which the record mark length becomes not more than ¼ of the spot diameter, the top pulse coefficient is increased, and thus, the linearity between the multilevel data and the off pulse width is maintained. The record mark length corresponding to the multilevel data depends on a recording density, i.e., the cell length. Accordingly, the multilevel data for which the top pulse coefficient is increased changes according to a combination between the recording spot diameter and the cell length. Details are described below.

In the above-described second embodiment, the record mark zone for increasing the top pulse coefficient j differs according to the recording spot diameter and the mark linear velocity, and thus, has correlation with the spot diameter. For a case of an optical pickup of a common RIM intensity (approximately 50%), a spot diameter $\phi$ having relative intensity $1/e^2$ with respect to a local value of intensity distribution is such that $\phi = k \times \lambda / NA$ ($k \approx 0.86$) for wavelength $\lambda$, numerical aperture NA and off pulse coefficient k. That is, the spot diameter $\phi \approx 0.53$ μm for the optical pickup in the first embodiment.

Figure 11:
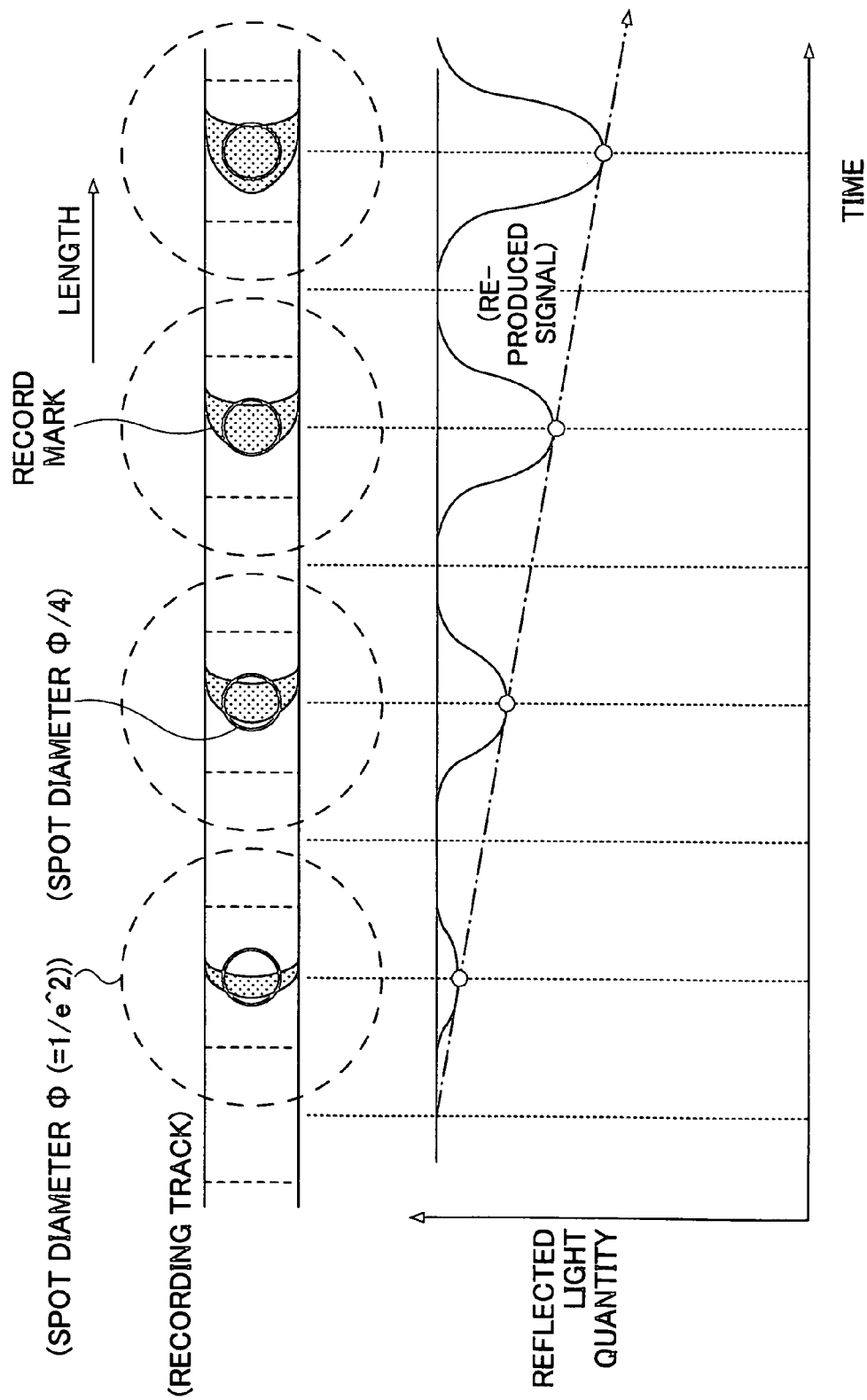
FIG. 11 illustrates relationship between a condition for the off pulse width Toff linearity being absent and the spot diameter $\phi$.
Figure 12:
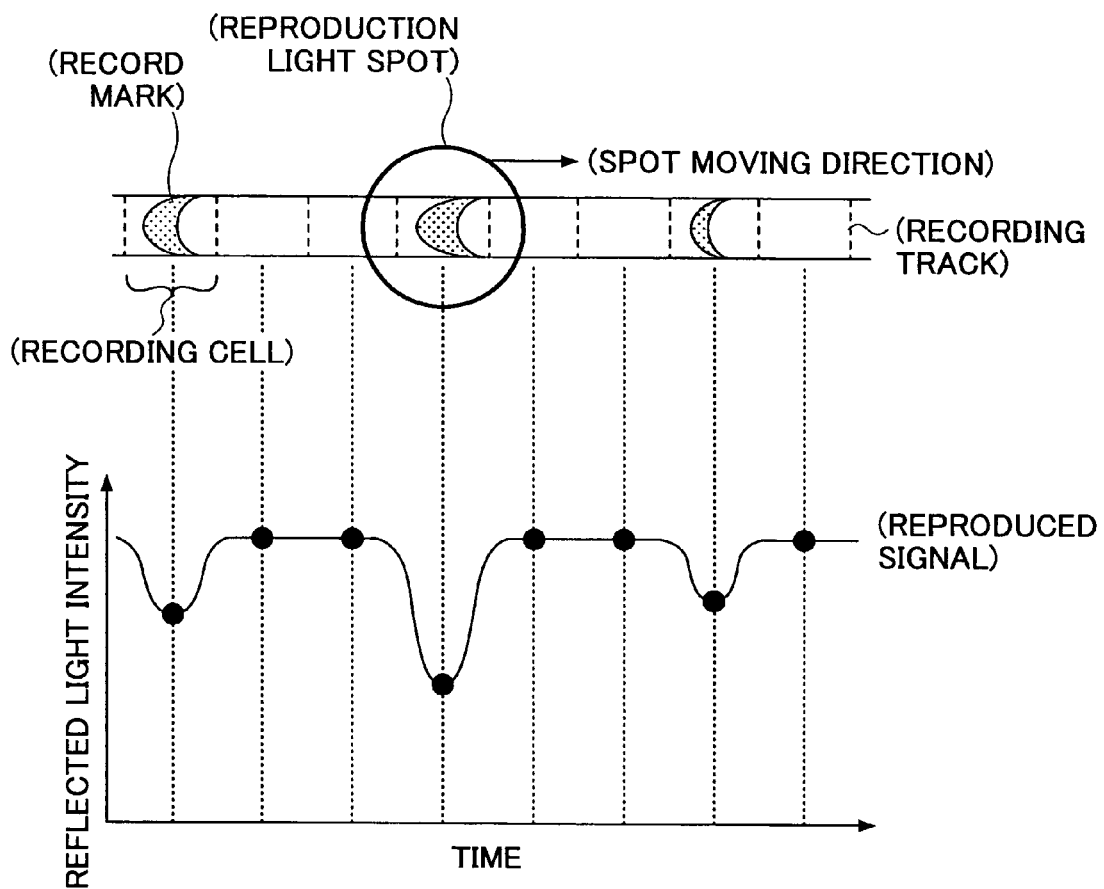
FIG. 12 illustrates a reproduced signal sampled example at a predetermined frequency.
Figure 13:
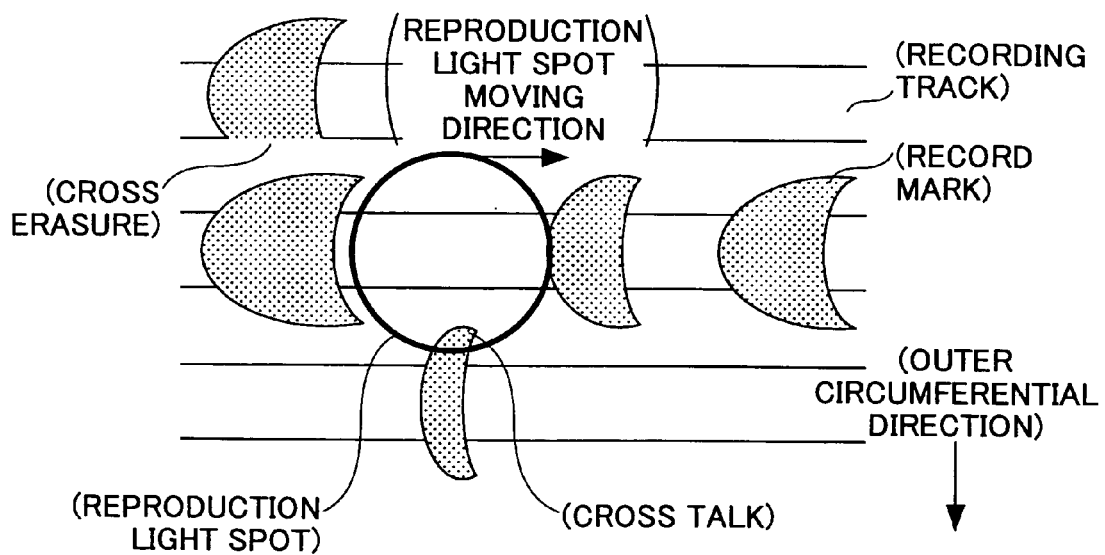
FIG. 13 is a diagram illustrating a trouble occurring from insufficiency of the top pulse width setting.

Further, the record mark period cell length is 0.28 μm, and 7 sorts of record mark lengths are produced corresponding to the multilevel data m. At this time, for a phase change type optical recording medium having a recording layer of Ag—In—Sb—Te or such, when a mark sufficiently smaller than the spot diameter, mark production may become insufficient when the off pulse width, which is a cooling pulse, is reduced and thus sufficiently sharp cooling cannot be provided. As a result, linearity between the mark length and the off pulse length is not be provided. Thus, a mark in the off pulse width Toff nonlinear zone has a reduced cooling time setting interval and a precise mark length cannot be obtained, whereby the above-described σ/DR value may degrade. Such a condition of loss of the off pulse width Toff linearity, as shown in FIG. 11, occurs where the record mark length is around ¼ of the above-described spot diameter $\phi$, and well coincides with a line density zone in which CN ratio decreases when a single mark and a space are successively recorded.

In the conditions of the first embodiment, $\frac{1}{4} \times \phi \approx 0.13$ μm corresponds thereto, which corresponds to the mark length 0.12 μm corresponding to the multilevel data 3. Accordingly, in order to carry out recording of the record marks corresponding to the multilevel data 0, 1 and 2 with maintaining the off pulse Toff linearity, it is effective to increase a heating achievement temperature by increasing the top pulse width Ton. As a result, an amorphous zone increases thanks to sharp cooling, which makes it possible to achieve a target level of the reflected light intensity.

Further, for an optical pickup employing a red LED such as that for a DVD, $\lambda$=660 μm and NA=0.65 are applied, and the spot diameter $\phi \approx 0.87$ μm. In this case, by increasing the top pulse width Ton corresponding to the record mark length not more than 0.22 μm, the linearity of the off pulse width Toff can be easily maintained, and recording with a satisfactory σ/DR value can be carried out.

Thus, production of minute marks thanks to such a selection of the top pulse width Ton and the off pulse width Toff is especially advantageous for an optical recording medium which has phase change between the amorphous phase and the crystalline phase, by means of sharp cooling and gentle cooling, employing, as a recording layer, Ge—Sb—Te family, Ge—Te—Sb—S family, Te—Ge—Sn—Au family, Ge—Te—Sn family, Sb—Se family, Sb—Se—Te family, Sn—Se—Te family, Ga—Se—Te family, Ga—Se—Te—Ge family, In—Se family, In—Se—Te family, Ag—In—Sb—Te family, or such, and a control of a mark length can be easily carried out.

Fourth Embodiment

In the present embodiment, first, optimum recording power is obtained from test recording. Then, when it is determined that reproduced signal level linearity is low with the optimum recording power, test recording is carried out again, and the optimum off pulse width, or the optimum top pulse width and off pulse width are derived (the optimum recording power is applied in this test recoding) in order to set a signal level with a higher accuracy.

On the other hand, when it is determined that sufficient signal level linearity is obtained with the obtained recording power, the test recording is then finished. When sufficient reproduced signal reliability is thus obtained only from the recording pulse adjustment, no more process is required, and thus, the time required for optimizing the recording conditions can be reduced.

Figure 14:
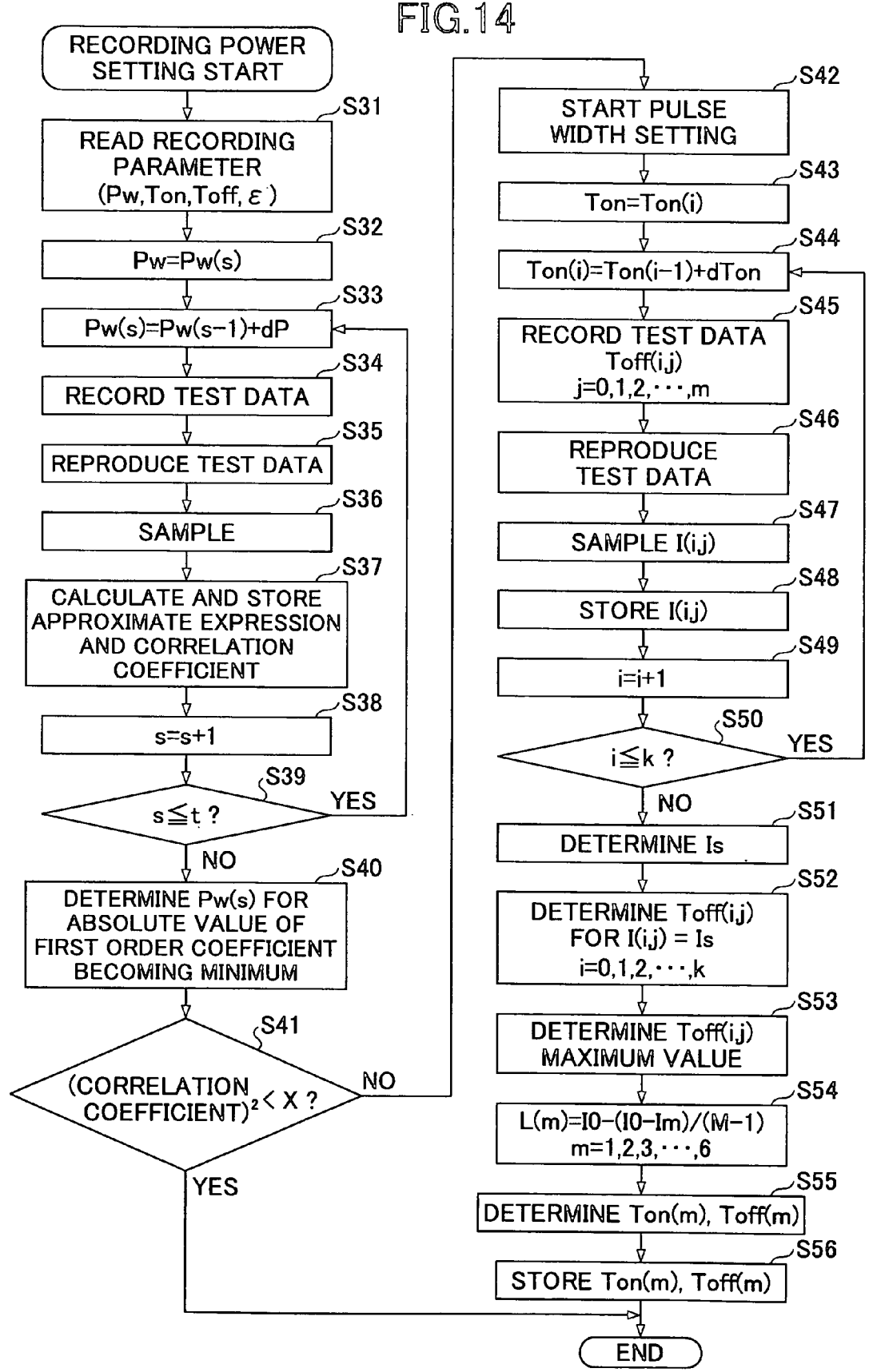
FIG. 14 is a general flow chart showing a recording condition optimization procedure in a fourth embodiment of the present invention.

A flow chart of FIG. 14 shows a recording condition optimizing procedure according to the present embodiment. Also this procedure is carried out by a micro computer of the information recording apparatus (optical disk apparatus). In this case, a program for causing the computer to carry out the procedure may be produced, be recorded in a predetermined recording medium such as a CD-ROM, or via a communication network such as the Internet, thus the program may be loaded in the computer, which may then be made to execute the program.

First, in Step S31, recording parameters are read from the optical disk. In the optical disk, as preformat information, the recording parameters, i.e., the recording power Pw, the erasure power Pe, the ratio ε between the erasure power Pe and the recording power Pw, and the top pulse widths Ton and the off pulse widths Toff corresponding to the multilevel data are previously recorded as wobble information, prepits, or record marks. The recording apparatus reproduces the information and uses as initial values of the recording conditions.

Figure 15:
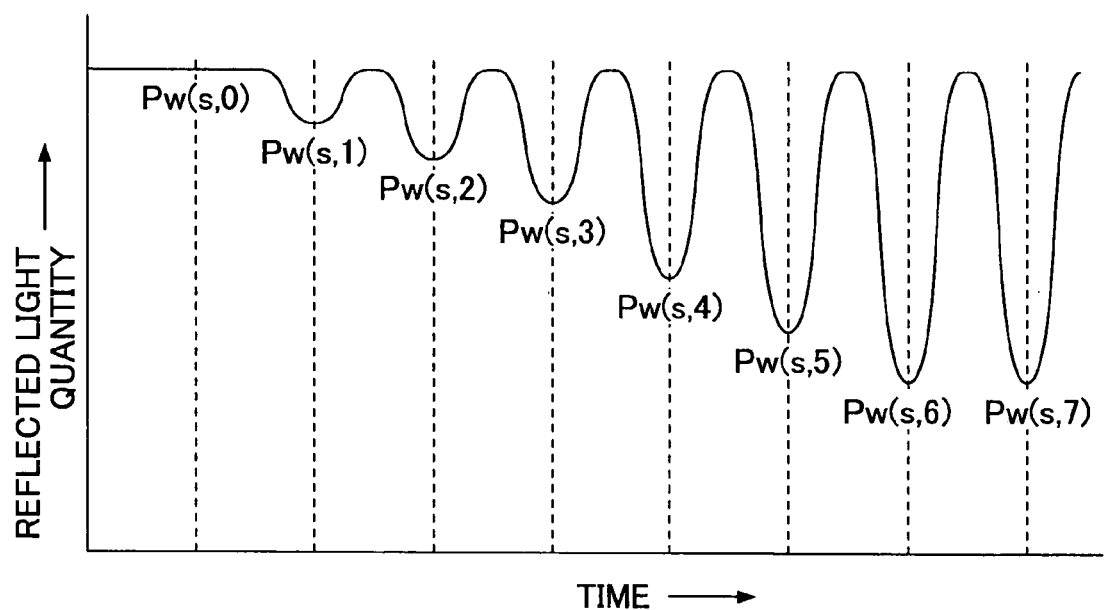
FIG. 15 is a characteristic diagram showing a test data reproduced signal waveform example.

Next, in Steps S32 through S39, the test recording through the approximate expression derivation are carried out. An initial value of the recording power is set (Step S32), first test data such as that shown in FIG. 3 is recorded/reproduced (Step S34, S35), and reflected light intensity Pw(s,m) of multilevel data with the recording power P(s) is sampled (Step S36) (see FIG. 15 for the reproduced signal of the test data). It is noted that, for a case of 8-level recording, m=0, 1, 2, . . . , 7.

Next, relationship between the multilevel data m and the reflected light intensity Pw(s,m) obtained from the sampled results is approximated by a quadratic function=As·m²+Bs·m+Cs, and the coefficients As, Bs and Cs of the approximate expression thus obtained are stored in the storage device (Step S37). These steps (Steps S34 through S37) are repeated with changing the recording power in sequence (Step S38, S39).

Then, in Step S40, the optimum recording power is determined. There, the coefficients of the approximate expression for each recording power obtained are referred to, selection is made for the second order coefficient |As| being the minimum value, and the corresponding recording power is obtained as the optimum recording power.

Figure 16:
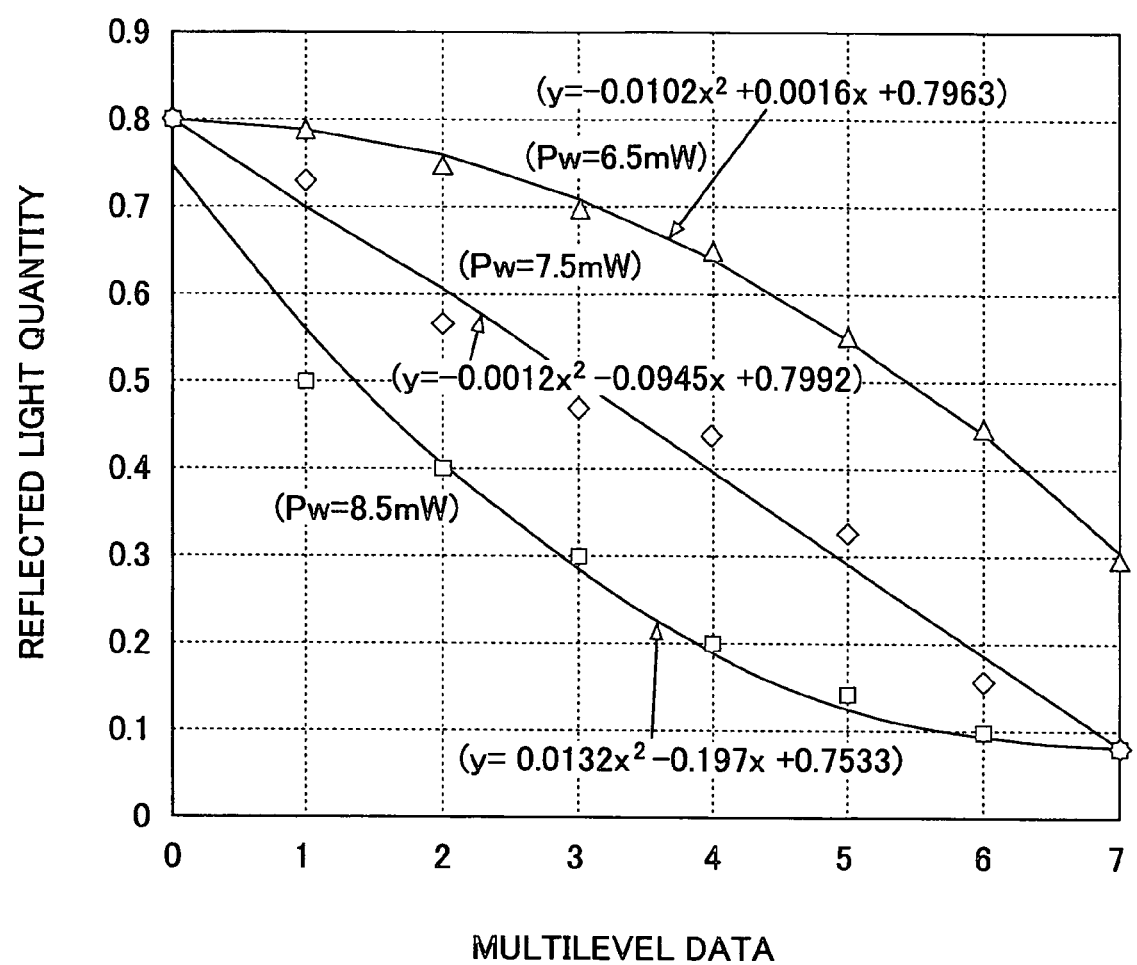
FIG. 16 is a characteristic diagram showing relationship between the multilevel data m and the reflected light intensity when the recording power is changed.

FIG. 16 shows an example of relationship between the multilevel data m and the reflected light intensity I with a change of the recording power, obtained in the above-mentioned steps (repetition of Steps S34 thorough S37). For each curve, when a quadratic function is obtained, the approximate expression becomes nearer to a straight line, as the absolute value of the second order coefficient is smaller. This is the reason why the recording power at which the absolute value of the second order coefficient becomes minimum is determined as a candidate of the optimum recording power.

In the case of FIG. 16, the approximate expression is:

$$I = F \cdot m^2 + G \cdot m + H$$

When I=y and m=x, the following approximate expression is obtained for each recording power:

Pw=6.5 mW:

$$y = -0.0102x^2 + 0.0016x + 0.7963$$

Pw=7.5 mW:

$$y = -0.0012x^2 - 0.0945x + 0.7992$$

Pw=8.5 mW:

$$y = 0.0132x^2 - 0.197x + 0.7533$$

In this example, the absolute value of the second order coefficient of the approximate expression corresponding to Pw=7.5 mW is minimum, and thus, this becomes a candidate of the optimum recording power.

Then, in Step S41, linearity between the multilevel data and the reflected light intensity is determined. With the optimum recording power determined in Step S40, relationship between the multilevel data m and the reflected light intensity Pw(s,m) is approximated by a linear function Pw(s,m)=Dm+E, and the second power $r^2$ of correlation factor r is calculated. At this time, when $r^2$ is small, Step S42 is carried out then. If not, the test recording is finished.

Figure 17:
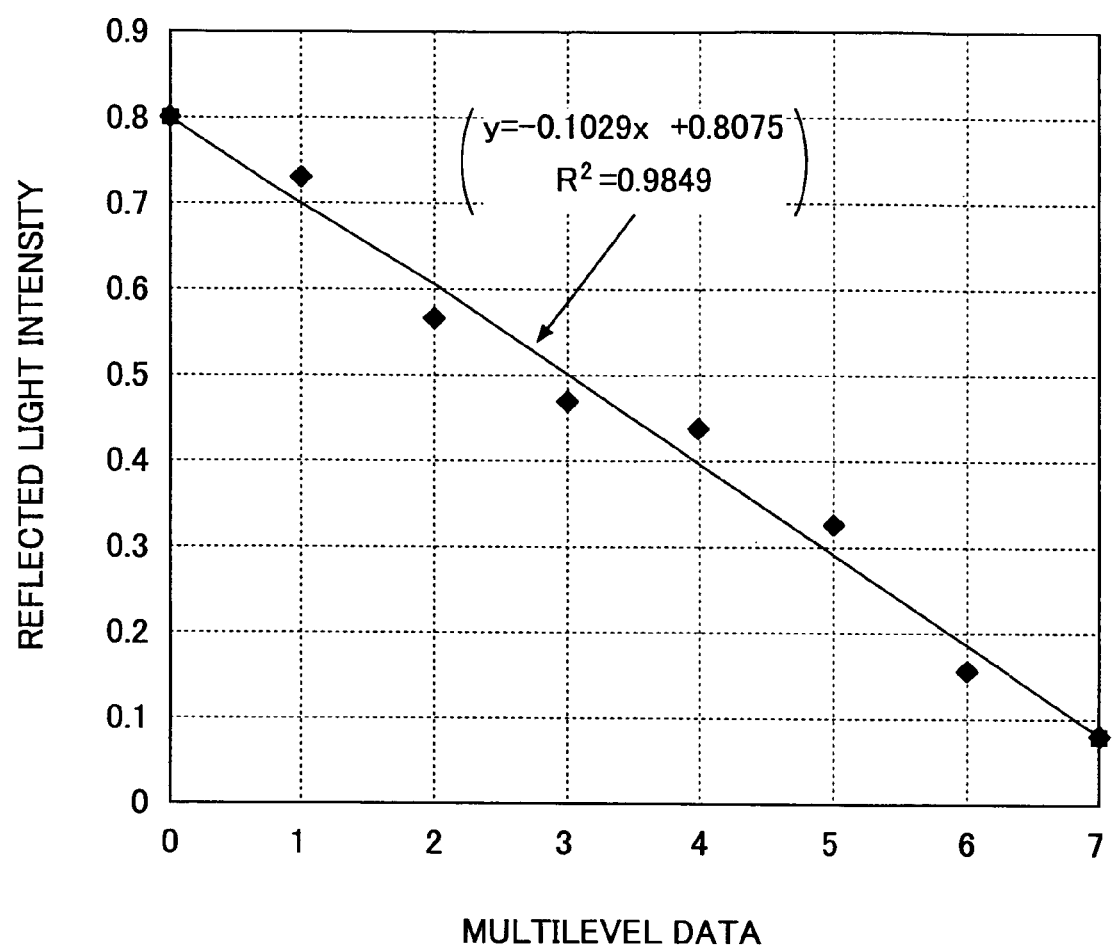
FIG. 17 is a characteristic diagram illustrating a method of determining linearity between the multilevel data and the reflected light intensity.

A method of determining linearity between the multilevel data and the reflected light intensity at this time is described with reference to FIG. 17. FIG. 17 shows a result when approximation is made from relationship between the multilevel data and the reflected light intensity for the case of the recording power (Pw=7.5 mW) determined from the three sorts of recording power shown in FIG. 16. There, a value of the second power of the correlation coefficient r is calculated, and this coefficient value is used to determine the linearity as a criterion. The correlation coefficient is calculated with the use of a Pearson's product moment correlation coefficient defined by the following expression:

$$r = \text{(covariance of variant } x \text{ and variant } y)/$$
$$\{(\text{standard deviation of variant } x) \times$$
$$(\text{standard deviation of variant } y)\} =$$
$$\frac{\frac{1}{7}\sum_{m=0}^{7}(x_m - x_{ave})(y_m - y_{ave})}{\sqrt{\frac{1}{7}\sum_{m=0}^{7}(x_m - x_{ave})^2}\sqrt{\frac{1}{7}\sum_{m=0}^{7}(y_m - y_{ave})^2}}$$

In this expression, $x_{ave}$: average of x, and $y_{ave}$: average of y.

That is, when the value $r^2$ is large, it means that error between the monitored result and the approximate expressing obtained is small. Accordingly, from this value, it can be determined whether or not the relationship is linear. When $r^2$ is smaller than a predetermined value, it is necessary to improve linearity, and Step S42 of pulse width adjustment is carried out then.

The optimum pulse width derivation procedure of Steps S43 through S56 are the same as those of Steps S1 through S41 in FIG. 2 described for the first embodiment. In the first embodiment, when the pulse width is derived, a cubic function is used to approximate relationship between the pulse width and the signal level. However, for the present embodiment, an example where a quadratic function is used for approximation will now be described.

First, for each top pulse width Ton with which the test recording has been carried out, the Toff-reflected light intensity curve is approximated by a quadratic function. Next, it is determined whether or not this curve reaches Is. The top pulse width Ton with which the curve reaching Is is obtained is selected. Then, from among the thus-selected top pulses Ton, the top pulse width Ton for which the absolute value of first order coefficient of the relevant approximate expression is minimum is determined as the optimum top pulse width.

In the example of FIG. 5, the approximate expression is:

$$I = J \cdot Toff^2 + K \cdot Toff + L$$

Then, when replacement is made such that I=y, Toff=x, Ton=1.6T:

$$y = 0.0027x^2 - 0.0806x + 0.9921$$

Ton=2.4T:

$$y = 0.0051x^2 - 0.1155x + 1.0383$$

Ton=3.2T:

$$y = 0.0088x^2 - 0.429x + 0.9893$$

Thus, Ton=1.6T is selected as a typical value of the optimum top pulse width.

Further, the off pulse width for each multilevel data may be set with the use of the quartic function used there. A method of the setting is the same as that described for the second embodiment.

Also for a case where the relationship between the pulse width and the signal level is approximated by a linear function, the optimum top pulse width can be determined in the same procedure. Further, the off pulse width for each multi-level data can be set with the use of the linear approximate expression. However, depending on the characteristics of the optical disk to use, a higher order approximate expression is preferable to set the of pulse width with a higher accuracy.

By storing the thus-determined recording parameters in the storage device after the finish of the test recording, this information can be used for test recording in recording in a subsequent time, and a time required for the recording condition optimization can be reduced. As the information to record, at least information concerning the manufacture of the optical disk, and the recording parameters (see Table 4 below) determined by the test recording. Information of not only the optical disk manufacturer, but also a type of the optical disk (material of the recording layer; phase change material or die material) should also be preferably stored in the storage device. This is because, when the disk manufacture and the disk type are common, the recording parameters may be approximately common even if the same optical disk itself is not used. Accordingly, the test recording results once obtained can be approximately reflected, and thus, test recording can be finished within a reduced time.

TABLE 4

| MEDIUM MANUFACTURER | TYPE | Pw(mW) | ϵ | Ton_1(T) | Ton_2(T) | ... | Ton_7(T) | Toff_1(T) | Toff_2(T) | ... | Toff_7(T) |
|---|---|---|---|---|---|---|---|---|---|---|---|
| A COMPANY | RW | Pwa | ϵa | Ton_1a | Ton_2a | ... | Ton_7a | Toff_1a | Toff_2a | ... | Toff_7a |
| B COMPANY | RW | Pwb | ϵb | Ton_1b | Ton_2b | ... | Ton_7b | Toff_1b | Toff_2b | ... | Toff_7b |
| C COMPANY | R | Pwc | — | Ton_1c | Ton_2c | ... | Ton_7c | Toff_1c | Toff_2c | ... | Toff_7c |
| . | . | . | . | . | . | ... | . | . | . | ... | . |
| . | . | . | . | . | . | ... | . | . | . | ... | . |

Fifth Embodiment

In the present embodiment, a value of the recording power, read as the previously written preformat information, from the optical disk, is used, and a signal level is adjusted with a change of the recording pulse width. Error between a set value of the recording power in the recording apparatus and an output value is adjusted by the top pulse width (laser light emitting time), and linearity between the multilevel data and the signal level is adjusted by the off pulse width. In this configuration, a flow chart of deriving the optimum recording pulse widths is started from Step S42 of FIG. 14, and thus, the recording condition setting time can be reduced.

Sixth Embodiment

In the present embodiment, a value of the top pulse width, read as previously written preformat information, from the optical disk, is used; the optimum off pulse width is derived from test recording; and after that, the optical recording power is obtained.

The recording condition deriving flow chart is the same as that of FIG. 2. What is different therefrom is that, in Step S2 of this process, k is fixed as 1, and a value of the top pulse width Ton read from the recording medium is used. In this configuration, the top pulse width setting time can be reduced. There, optimization of the recording power is made by the test recording. Accordingly, a process of optimizing the top pulse width is omitted.

In the embodiment, a value read from the optical disk is used as the recording power when the pulse width is to set. The recording power has error between the set value and the output value for each recording apparatus. Accordingly, when the off pulse width is set in a condition in which the error is large, sufficient recording performance may not be obtained. Therefore, the inventors of the present invention studied for influence on recording quality when the pulse width is set in a condition in which the recording power error is large.

Figure 18:
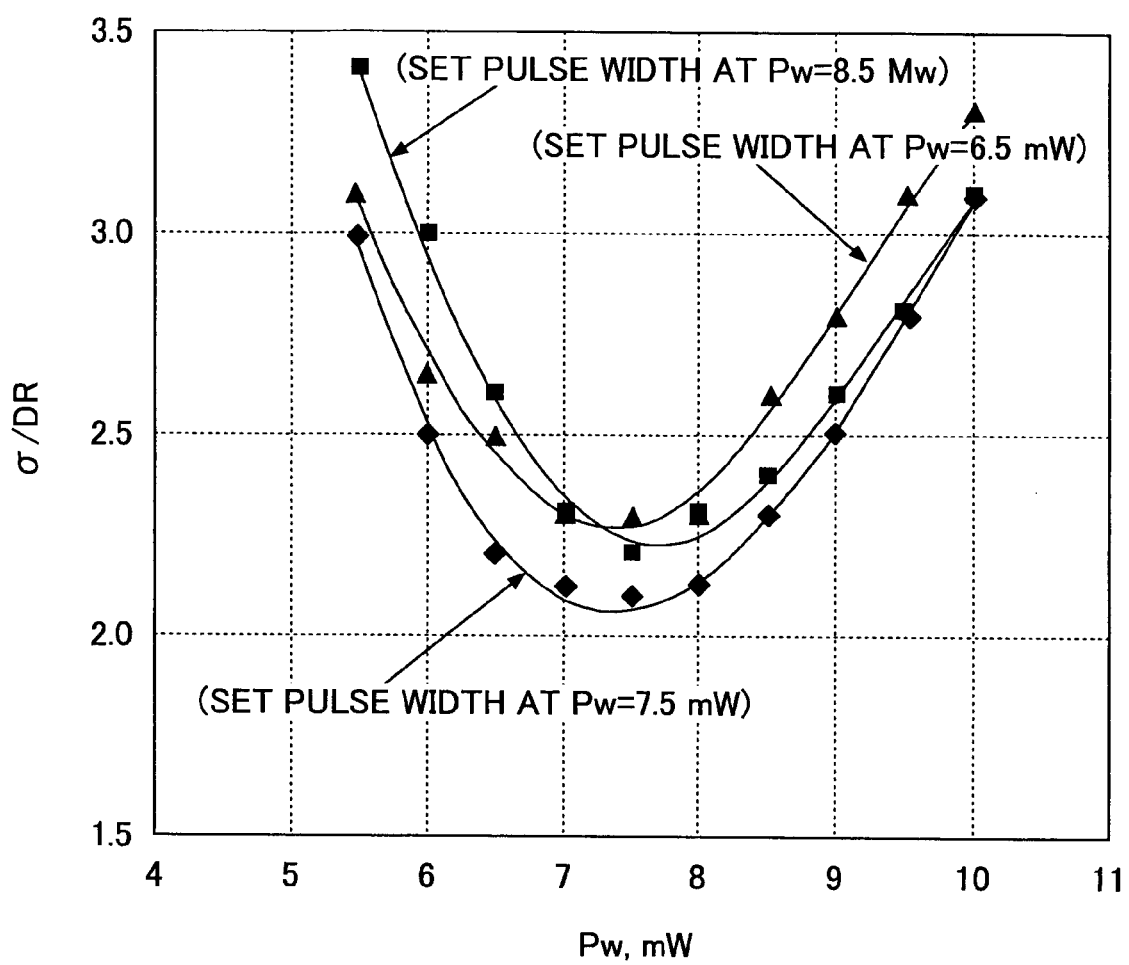
FIG. 18 is a characteristic datagram showing an experimental result in a sixth embodiment of the present invention.

FIG. 18 shows the experimental results. The recoded data was a multilevel data random pattern, and the recording quality was evaluated by σ/DR. The allowable value of σ/DR is not more than 3% (σ/DR<3% corresponds to DVD jitter<15%). From FIG. 18, it is seen that when the pulse width was set with the recording power 7.5 mW, the best recording quality was obtained, and at the time, σ/DR=2.1%.

When the pulse width was set with Pw=6.5 mW, σ/DR=2.5%. However, it is seen that, even in this case, when recording was made with Pw=7.5 mW with the off pulse condition unchanged, σ/DR lowers to 2.3%, and thus, no significant difference appeared in the recording quality from the case where the off pulse width was set with Pw=7.5 mW.

When the recording power was shifted to a higher side (when the off pulse was set with Pw=8.5 mW), it was confirmed that, sufficient recording quality can be ensured, the same as the above, as a result of the optimum recording power being determined after the test recording, in which the recording power was changed after the pulse width setting.

Seventh Embodiment

In the present embodiment, as the recording power and the off pulse width corresponding to the multilevel data, values read from the optical disk are used. Test recording is carried out in the corresponding condition, and, by adjusting the top pulse width for each multilevel data, error between the recording power setting value and output value, and linearity between the multilevel data and the signal level, are adjusted.

Figure 19:
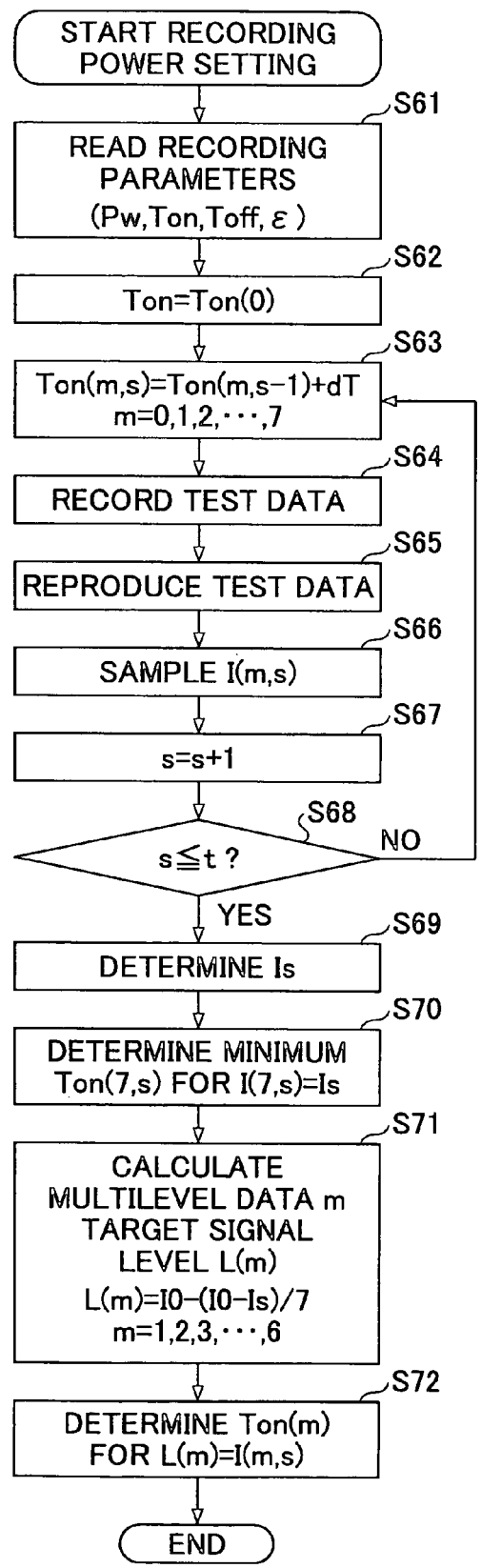
FIG. 19 is a general flow chart showing a procedure of determining top pulse width for each multilevel data in a seventh embodiment of the present invention.

FIG. 19 shows a flow chart of the top pulse determination for each multilevel data. Also this procedure may be carried out by a computer included in the information recording apparatus (optical risk apparatus). In this case, a program for causing the computer to execute this procedure may be produced, then stored in a predetermined recording medium such as a CD-ROM, or loaded from a communication network such as the Internet, and installed in the computer, and then, executed by the computer.

Figure 20:
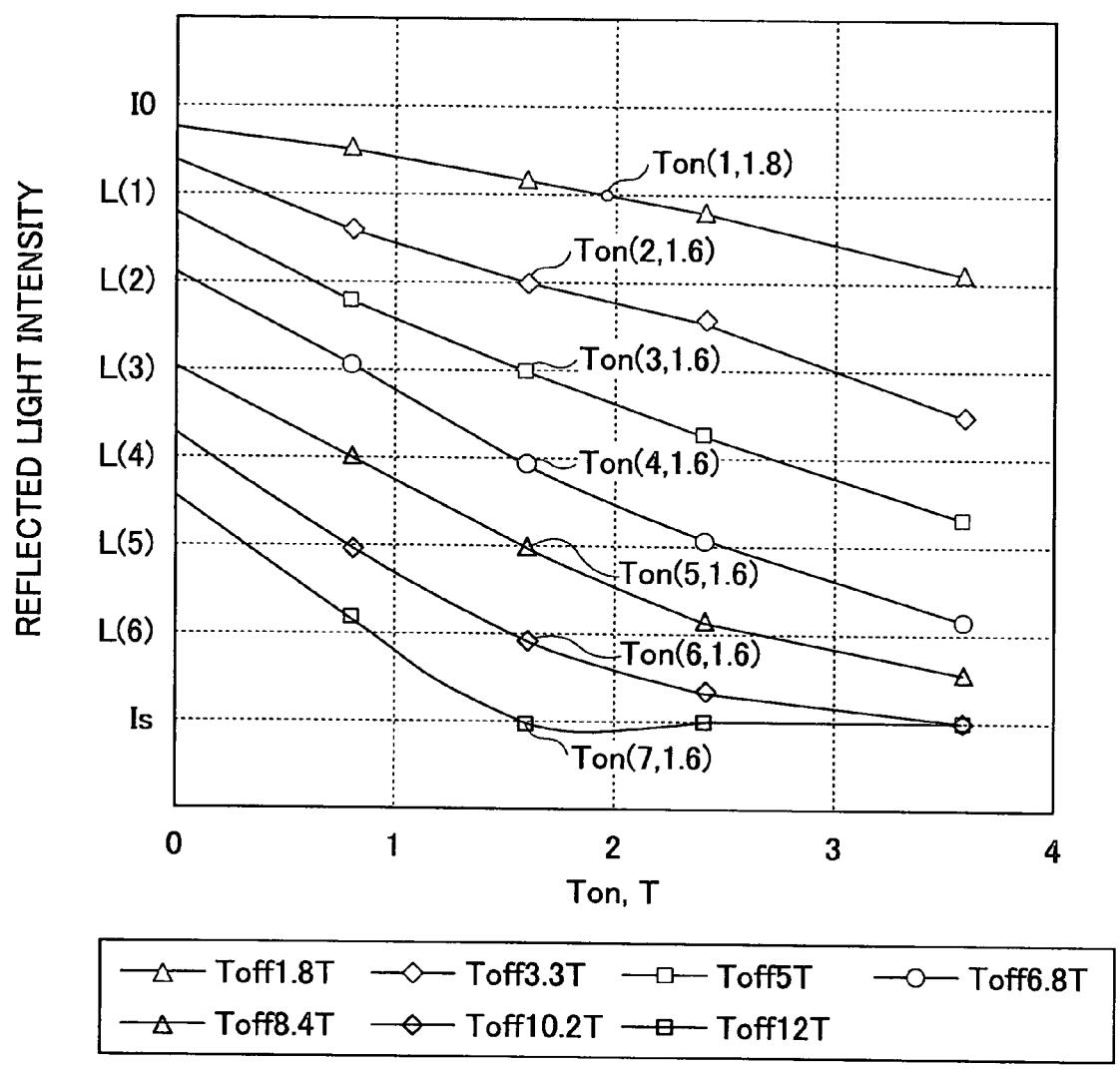
FIG. 20 is a characteristic diagram showing a result of test recording.

FIG. 20 shows results when the test recording was made according to Steps S61 through S72 of this flow chart. In FIG. 20, the off pulse width for each multilevel data read from the optical disk in Step S61 (see Table 5 below) was used, test recording was made (Step S64) with a change of the top pulse width in Step S63, and sampling (Step S66) results I(m,s) of the reproduced signal thus obtained in Step S65 was plotted. I(m,s) shows a level of the reproduced signal obtained when the multilevel data value m was recorded.

From the result of FIG. 20, Is with which the signal level is saturated is determined (Step S69). The minimum Ton(s) with which I(7,s) reaches Is is determined (see Table 6; Ton=1.6T, in the example of FIG. 20) (Step S70).

Next, a target signal level L(m) (a signal level at which the multilevel data and the signal level become linear) for each of the multilevel data 1 through 6 is calculated with the use of the following expression:

$L(m)=I0-m\cdot(I0-Is)/7$

Then, from the result of FIG. 20, Ton(m,s) resulting in the target value L(m)=I(m,s) for each multilevel data is obtained from the corresponding curve (see FIG. 20). From this procedure, linearity can be ensured only with adjustment of the top pulse width.

TABLE 5

| MULTILEVEL DATA | Toff(T) |
|---|---|
| 1 | 1.6 |
| 2 | 3.3 |
| 3 | 5.0 |
| 4 | 6.8 |
| 5 | 8.4 |
| 6 | 10.2 |
| 7 | 12.0 |

TABLE 6

| MULTILEVEL DATA | Ton(T) DETERMINED FROM TEST RECORDING |
|---|---|
| 1 | 1.8 |
| 2 | 1.6 |
| 3 | 1.6 |
| 4 | 1.6 |
| 5 | 1.6 |
| 6 | 1.6 |
| 7 | 1.6 |

The methods of optimization of the recording parameters have been described. Any one of the flow charts may be selected appropriately according to a condition of the information recording apparatus. That is, when laser power is calibrated in the information recording apparatus, the recording power read from the optical disk can be used. Accordingly, the recording power optimization should not be carried out, and only the recording pulse should be optimized. For the other case, since the laser power of the recording apparatus cannot be relied upon (error exists between the set power and the output power), optimization of the recording power should be carried out first.

The recording parameter optimization method in each embodiment of the present invention described above may be executed as a result of, a program for causing the computer to execute each step of this method being produced, then stored in a predetermined recording medium such as a CD-ROM, or loaded from a communication network such as the Internet, and installed in the computer, and then, executed by the computer. Alternatively, a circuit may be configured in such a manner that the method is executed by the hardware circuit, and thus, the method may be realized in a form of the hardware circuit.

Further, the present invention is not limited to the above-described embodiments, and may be realized in other various embodiments within the technical scope claimed in the claims below.

The present application is based on Japanese Priority Applications Nos. 2003-357397 and 2004-133222, filed on Oct. 17, 2003 and Apr. 28, 2004, respectively, the entire contents of which are hereby incorporated herein by reference.

What is claimed is:

1. An information recording method for recording record marks according to multilevel data on an optical disk, comprising:

performing test recording to determine an optimum recording power for recording pulses according to multilevel data, each pulse comprising a top pulse, an off pulse and an erasure pulse, the test recording comprising:

first step of recording first test data for a plurality of top pulse widths Ton and monitoring reflected light intensity corresponding to the first test data for each top pulse width Ton to produce a respective monitoring result;

second step of determining an optimum top pulse width Ton, from among the plurality of top pulse widths Ton, based on the monitoring results;

third step of determining respective optimum off pulse widths Toff for multilevel data, based on the monitoring result of the optimum top pulse width Ton determined in said second step; and fourth step of recording second test data using the optimum top pulse width Ton and the optimum off pulse widths Toff determined in said second and third steps for a plurality of recording powers that are changed in sequence, monitoring reflected light intensity corresponding to the second test data for each recording power to produce a respective monitoring result, and determining the optimum recording power, from among the plurality of recording powers, based on the monitoring results corresponding to the second test data, wherein in said second step, the optimum top pulse width is determined from the following relational expression between the off pulse widths Toff and the reflected light intensity I with respect to the respective monitoring result for a top pulse width Ton:

$$I = a \cdot \text{Toff}^3 + b \cdot \text{Toff}^2 + c \cdot \text{Toff} + d$$

wherein the top pulse width Ton in which the absolute value of the coefficient c is smallest is determined as the optimum top pulse width.

2. An information recording method for recording record marks according to multilevel data on an optical disk, comprising:

performing test recording to determine an optimum recording power for recording pulses according to multilevel data, each pulse comprising a top pulse, an off pulse and an erasure pulse, the test recording comprising:

first step of recording first test data for a plurality of top pulse widths Ton and monitoring reflected light intensity corresponding to the first test data for each top pulse width Ton to produce a respective monitoring result;

second step of determining an optimum top pulse width Ton, from among the plurality of top pulse widths Ton, based on the monitoring results;

third step of determining respective optimum off pulse widths Toff for multilevel data, based on the monitoring result of the optimum top pulse width Ton determined in said second step; and fourth step of recording second test data using the optimum top pulse width Ton and the optimum off pulse widths Toff determined in said second and third steps for a plurality of recording powers that are changed in sequence, monitoring reflected light intensity corresponding to the second test data for each recording power to produce a respective monitoring result, and determining the optimum recording power, from among the plurality of recording powers, based on the monitoring results corresponding to the second test data, wherein in said third step, assuming that the off pulse width is Toff(m), reflected light intensity is I(m) and coefficient is $\alpha$ when multilevel data m is test recorded, the optimum off pulse width Toff opt(m) according to the multilevel data m is set with the use of the following relational expression for the reflected light intensity L(m) as a target value of the multilevel data m:

$$\text{Toff } opt(m) = $$
$$\alpha \cdot (I(m) - L(m))/(I(m+1) - I(m))/(\text{Toff}(m+1) - \text{Toff}(m)) + \text{Toff}(m).$$

3. An information recording method for recording record marks according to multilevel data on an optical disk, comprising:

performing test recording to determine an optimum recording power for recording pulses according to multilevel data, each pulse comprising a top pulse, an off pulse and an erasure pulse, the test recording comprising:

first step of recording first test data for a plurality of top pulse widths Ton and monitoring reflected light intensity corresponding to the first test data for each top pulse width Ton to produce a respective monitoring result;

second step of determining an optimum top pulse width Ton, from among the plurality of top pulse widths Ton, based on the monitoring results;

third step of determining respective optimum off pulse widths Toff for multilevel data, based on the monitoring result of the optimum top pulse width Ton determined in said second step; and fourth step of recording second test data using the optimum top pulse width Ton and the optimum off pulse widths Toff determined in said second and third steps for a plurality of recording powers that are changed in sequence, monitoring reflected light intensity corresponding to the second test data for each recording power to produce a respective monitoring result, and determining the optimum recording power, from among the plurality of recording powers, based on the monitoring results corresponding to the second test data, wherein in said third step, the optimum off pulse width Toff opt(m) according to the multilevel data m is set with the use of the following relational expression between the off pulse width Toff(m) and the reflected light intensity I(m):

$$I(m) = a \cdot \text{Toff}(m)^3 + b \cdot \text{Toff}(m)^2 + c \cdot \text{Toff}(m) + d.$$

4. An information recording method for recording record marks according to multilevel data on an optical disk, comprising:

performing test recording to determine an optimum recording power for recording pulses according to multilevel data, each pulse comprising a top pulse, an off pulse and an erasure pulse, the test recording comprising:

first step of recording first test data for a plurality of top pulse widths Ton and monitoring reflected light intensity corresponding to the first test data for each top pulse width Ton to produce a respective monitoring result;

second step of determining an optimum top pulse width Ton, from among the plurality of top pulse widths Ton, based on the monitoring results;

third step of determining respective optimum off pulse widths Toff for multilevel data, based on the monitoring result of the optimum top pulse width Ton determined in said second step; and fourth step of recording second test data using the optimum top pulse width Ton and the optimum off pulse widths Toff determined in said second and third steps for a plurality of recording powers that are changed in sequence, monitoring reflected light intensity corresponding to the second test data for each recording power to produce a respective monitoring result, and determining the optimum recording power, from among the plurality of recording powers, based on the monitoring results corresponding to the second test data, wherein in said second step, the optimum top pulse width is determined from the following expression between the off pulse widths Toff and the reflected light intensity I with respect to the respective monitoring result for a top pulse width Ton $$I = a \cdot Toff^3 + b \cdot Toff^2 + c \cdot Toff + d$$

wherein the coefficients a, b, c and d are approximated as functions of the top pulse width Ton, a Toff-reflected light intensity curve at the top pulse width Ton is estimated, and the shortest top pulse width Ton in which the reflected light intensity I becomes a saturated value is determined as the optimum top pulse width.

5. An information recording method for recording record marks according to multilevel data on an optical disk, comprising:

performing test recording to determine an optimum recording power for recording pulses according to multilevel data, each pulse comprising a top pulse, an off pulse and an erasure pulse, the test recording comprising:

first step of recording first test data for a plurality of top pulse widths Ton and monitoring reflected light intensity corresponding to the first test data for each top pulse width Ton to produce a respective monitoring result;

second step of determining an optimum top pulse width Ton, from among the plurality of top pulse widths Ton, based on the monitoring results;

third step of determining respective optimum off pulse widths Toff for multilevel data, based on the monitoring result of the optimum top pulse width Ton determined in said second step; and fourth step of recording second test data using the optimum top pulse width Ton and the optimum off pulse widths Toff determined in said second and third steps for a plurality of recording powers that are changed in sequence, monitoring reflected light intensity corresponding to the second test data for each recording power to produce a respective monitoring result, and determining the optimum recording power, from among the plurality of recording powers, based on the monitoring results corresponding to the second test data, wherein in said second step, the optimum top pulse width is determined from the following expression between the off pulse widths Toff and the reflected light intensity I with respect to the respective monitoring result for a top pulse width Ton $$I = a \cdot Toff^3 + b \cdot Toff^2 + c \cdot Toff + d$$

wherein the coefficients a, b, c and d are approximated as functions of the top pulse width Ton, a Toff-reflected light intensity curve at the top pulse width Ton is estimated, and the top pulse width Ton in which the respective off pulse width Toff(m) and the reflected light intensity I are approximately linear is set for each multilevel data m.

6. The information recording method as claimed in any one of claims 1 through 5, wherein:

in said fourth step, test recording is carried out for each recording pulse setting, and the optimum recording power is determined as the recording power in which deviation of the reflected light intensity is minimum.

* * * * *